(12) United States Patent
Kimura et al.

(10) Patent No.: US 8,960,043 B2
(45) Date of Patent: Feb. 24, 2015

(54) STEERING DEVICE

(75) Inventors: Yukihide Kimura, Gotenba (JP); Ryota Osumi, Sunto-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 101 days.

(21) Appl. No.: 13/636,071

(22) PCT Filed: Mar. 29, 2010

(86) PCT No.: PCT/JP2010/055562
§ 371 (c)(1),
(2), (4) Date: Sep. 19, 2012

(87) PCT Pub. No.: WO2011/121699
PCT Pub. Date: Oct. 6, 2011

(65) Prior Publication Data
US 2013/0014604 A1    Jan. 17, 2013

(51) Int. Cl.
*B62D 1/04*     (2006.01)
*B62D 1/02*     (2006.01)
*B62D 1/14*     (2006.01)

(52) U.S. Cl.
CPC ... *B62D 1/02* (2013.01); *B62D 1/14* (2013.01)
USPC ............................................. 74/492; 280/778

(58) Field of Classification Search
CPC ............. B62D 1/04; B62D 1/10; B62D 1/166
USPC ..................... 74/792, 492; 280/778
See application file for complete search history.

(56) References Cited

U.S. PATENT DOCUMENTS 3,176,537 A * 4/1965 Zeigler ............................ 74/492
3,282,124 A * 11/1966 Peterson ......................... 74/494

(Continued)

FOREIGN PATENT DOCUMENTS

| JP | 2004 244022 | 9/2004 |
| JP | 2006 224818 | 8/2006 |
| JP | 2006-264512 | 10/2006 |
| JP | 2008 105468 | 5/2008 |
| JP | 2008 174006 | 7/2008 |
| JP | 2009 202837 | 9/2009 |

OTHER PUBLICATIONS

International Search Report Issued Apr. 20, 2010 in PCT/JP10/55562 Filed Mar. 29, 2012.

*Primary Examiner* — William C Joyce
(74) *Attorney, Agent, or Firm* — Oblon, Spivak, McClelland, Maier & Neustadt, L.L.P.

(57) ABSTRACT

A steering device that is enabled to move and operate in multiple directions and has a simple configuration. A steering device is equipped with a steering member and a guide member, and the guide member is attached to an input shaft. The steering member is provided with left and right grips, and a movement direction changing mechanism is provided between the guide member and the left and right grips. If the left and right grips are operated by a small steering angle, the movement direction of the left and right grips is changed to the direction around the input shaft through the movement direction changing mechanism. When the left and right grips are operated by a large steering angle, the movement direction of the left and right grips is the direction around the input shaft.

6 Claims, 21 Drawing Sheets

(56) References Cited

U.S. PATENT DOCUMENTS

| | | | |
|---|---|---|---|
| 4,701,058 A * | 10/1987 | Mottate | 384/45 |
| 7,017,704 B2 * | 3/2006 | Kapaan et al. | 180/315 |
| 7,726,692 B2 * | 6/2010 | Ozaki et al. | 280/778 |
| 7,806,224 B2 * | 10/2010 | Maeda et al. | 180/334 |
| 8,540,281 B2 * | 9/2013 | Lisseman et al. | 280/778 |
| 2006/0214409 A1 | 9/2006 | Tamura et al. | |

* cited by examiner (a)

(b)

(a)

(b)

(a)

(b)

(a)

(b)

STEERING DEVICE

TECHNICAL FIELD

The present invention relates to a steering device that is provided at a driver's seat or the like of a vehicle and is enabled to be steered and operated by a driver or the like.

BACKGROUND ART

As steering devices that are provided at a driver's seat or the like of a vehicle and are enabled to be steered and operated by a driver or the like, in the related art, there is one that is operable in a rotational direction around a steering shaft and directions other than this. As such a steering device, a steering device that can rotate a steering grip in directions other than the rotational direction around the steering shaft is known (for example, refer to Patent Literature 1). This steering device can control the yaw characteristics or slip angle of a vehicle by rotating the steering grip.

CITATION LIST

Patent Literature

[Patent Literature 1] Japanese Unexamined Patent Application Publication No. 2008-174006

SUMMARY OF INVENTION

Technical Problem

However, in the steering device disclosed in the above Patent Literature 1, a rotating shaft of the grip other than the steering shaft is provided, and the rotation of the grip is transmitted to an electronic control unit via paths other than the steering shaft. For this reason, there are problems in that transmission paths may be diverse and structure may be complicated.

Thus, an object of the invention is to provide a steering device that is enabled to move and operate in multiple directions and has a simple configuration.

Solution to Problem

A steering device related to the invention that has solved the above problems includes a steering operation element operable by a driver, and a movement direction changing mechanism that changes an operation in the second movement direction to an operation in the first movement direction. The steering operation element is enabled to operate in a first movement direction that is a predetermined movement direction and a second movement direction that is a direction different from the first movement direction.

In the steering device related to the invention, an operation is made possible in the first movement direction and the second movement direction that is a direction different from the first movement direction. At this time, the steering device related to the invention is equipped with the movement direction changing mechanism that changes an operation in the second movement direction into an operation in the first movement direction. For this reason, movement and operation is made possible in multiple directions and a simple configuration can be provided.

Here, an aspect can be adopted in which the first movement direction is a movement direction around a main input shaft that transmits the movement of the steering operation element to a steering system.

In this way, in a case where the first movement direction is a movement direction around the main input shaft that transmits the movement of the steering operation element to the steering system, the rotational direction of the drive shaft can be the first movement direction of the invention.

Additionally, an aspect can be adopted in which a reaction force in the second movement direction is set to be smaller than a reaction force in the first movement direction.

In this way, as the reaction force in the second movement direction is set to be smaller than the reaction force in the first movement direction, an operation in the second movement direction is performed earlier than an operation in the first movement direction.

For this reason, since the operation in the second movement direction is eventually performed earlier than the first movement direction that is the movement around the main input shaft, the operation of the steering operation element can be made small in the case of a small steering angle where the drive shaft is rotated small. Accordingly, the operation amount of the driver can be reduced and a burden on the driver can be mitigated.

Moreover, an aspect can be adopted in which a change ratio of the movement direction changing mechanism in the first movement direction varies according to the amount of input in the second movement direction.

In this way, as the change ratio in the first movement direction varies according to the amount of input in the second movement direction, the change ratio varies gradually as approaching a position where the movement direction is changed. For this reason, a feeling of discomfort given to the driver can be reduced when the movement direction is changed from the first movement direction to the second movement direction.

Additionally, an aspect can be adopted in which a neutral position is set in the steering operation element, and restoring force imparting means is provided to restore the steering operation element to the neutral position.

In this way, as restoring force imparting means is provided to restore the steering operation element to the neutral position, the steering operation element can be easily restored to the neutral position.

Moreover, an aspect can be adopted in which damping force imparting means is provided to impart a damping force according to the amount of input in the second movement direction to the steering operation element.

In this way, as damping force imparting means is provided to impart a damping force according to the amount of input in the second movement direction, a damping force according to the amount of input can be imparted. Accordingly, the driver can easily grasp the amount of input to the second movement direction.

Additionally, an aspect can be adopted in which the second movement direction is a tangential direction of a virtual circle that is a locus in the first movement direction.

In this way, since the second movement direction is a tangential direction of a virtual circle that is a locus in the first movement direction, the distances from the input shaft in the second movement direction and the first movement direction are changed. As a result, a driver's operation becomes a small operation when a small steering angle of operation is performed and a driver's operation becomes a large operation when a large steering angle of operation is performed. Accordingly, since the driver's operation becomes the operation suited to the steering angle, a burden when a small steering angle of operation is performed can be made small.

Moreover, an aspect can be adopted in which a stopper is provided to regulate a movement in the second movement direction.

In this way, as a stopper is provided to regulate a movement in the second movement direction, the distance of travel in the second movement direction can be controlled. As a result, the change of the movement direction can be surely performed, and shifting in the first movement direction can be made after moderate movement in the second movement direction.

Additionally, an aspect can be made in which the movement direction changing mechanism includes a rotation member enabled to rotate in the first movement direction, and a curved member formed with a curved surface and enabled to move in the second movement direction, the rotation member rotates along the curved surface in the curved member with the movement of the curved member, the curvature of the curved surface in the curved member decreases toward end portions of the curved surface, and the distance between the end portions of the curved surface and the rotation center of the rotation member is smaller than the radius of the rotation member.

In this way, in the steering device related to the invention, the rotation member arrives at the end portions of the curved member if the movement of the curved member in the second movement direction proceeds. Here, the curvature of the curved surface in the curved member decreases toward the end portions of the curved surface, and the distance between the end portions of the curved surface and the rotation center of the rotation member is smaller than the radius of the rotation member. For this reason, after the rotation member arrives at the end portions of the curved member, the end portions of the curved member serve as stoppers, and shifting to the movement in the first movement direction in which the rotation member is directly rotated by the movement of the curved member is made. For this reason, it is unnecessary to separately provide stoppers and it is possible to contribute to reduction in the number of parts.

Also, an aspect can be adopted in which the second movement direction is a movement direction around a rotating shaft different from a rotating shaft in the first movement direction, and the movement direction changing mechanism changes a rotational operation in the second movement direction into a rotational operation in the first movement direction.

In this way, as the second movement direction is the movement direction around a different rotating shaft different from a rotating shaft in the first movement direction, the distance from the rotating shaft in the second movement direction to the steering operation element can be changed with respect to the distance from the rotating shaft in the first movement direction to the steering operation element. For this reason, since operation aspects when the steering operation element is operated to perform a large steering angle of turning and to perform a small steering angle of turning can be changed, the driver's operation can be made easy.

Advantageous Effects of Invention

According to the steering device related to the invention, movement and operation is made possible in multiple directions and a simple configuration can be provided.

DESCRIPTION OF EMBODIMENTS

Figure 1:
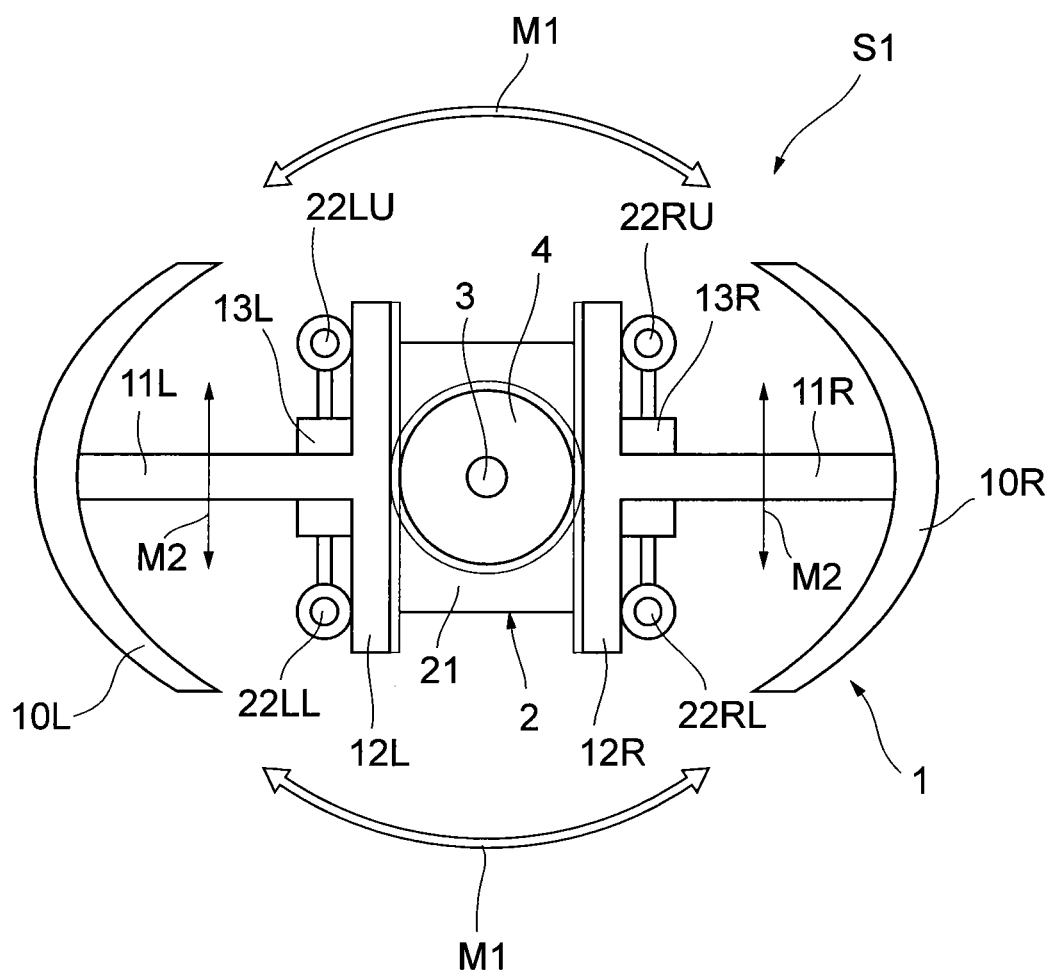
FIG. 1 is a front view of a steering device related to a first embodiment.

Embodiments of the invention will be described below with reference to the accompanying drawings. In addition, in the description of the drawings, the same elements will be designated by the same reference numerals, and a duplicate description will be omitted. Additionally, for convenience of illustration, dimension scales of the drawings do not necessarily coincide with those described.

First Embodiment

FIG. 1 is a front view of a steering device related to a first embodiment. As shown in FIG. 1, a steering device S1 related to the present embodiment is equipped with a steering member 1 and a guide member 2. The guide member 2 is equipped with a plate-shaped guide plate 21, and an input shaft (steering shaft) 3 that is a main input shaft of the invention rotatably passes through the guide plate 21. Moreover, a pinion gear 4 is fixed to a tip portion of the input shaft 3. As the input shaft 3 rotates, the rotation of the input shaft 3 is transmitted to a steering system of the invention, and steered wheels (not shown) in a vehicle are turned.

The steering member 1 is equipped with a left grip 10L and a right grip 10R that serve as a steering operation element of the invention. The left and right grips 10L and 10R are enabled to operate independently from each other. Additionally, a left end portion of a left rod 11L is fixed to the left grip 10L and a right end portion of a right rod 11R is fixed to the right grip 10R.

Additionally, a left rack member 12L is attached to a right end portion of the left rod 11L, and a right rack member 12R is attached to a left end portion of the right rod 11R. Additionally, a sliding mechanism (not shown) is provided between the left rod 11L and the guide plate 21 in the guide member 2. The movement of the left rack member 12L in a vertical direction is guided by this sliding mechanism. Similarly, a sliding mechanism is also provided between the right rod 11R and the guide plate 21, and the movement of the right rack member 12R in the vertical direction is guided. This vertical direction is a tangential direction of a virtual circle that is the locus of the input shaft 3 in the rotational direction thereof.

Moreover, both the left and right rack members 12L and 12R mesh with the pinion gear 4. For this reason, the pinion gear 4 rotates around the input shaft 3 with the movement of the left and right rack members 12L and 12R in the vertical direction. At this time, the guide member 2 does not rotate and the pinion gear 4 rotates relative to the guide member 2.

The left and right grips 10L and 10R changes an operation in the vertical direction that is a second movement direction M2 to an operation in the rotational direction around the input shaft 3 that is a first movement direction M1 by the left and right rack members 12L and 12R and the pinion gear 4. The left and right rack members 12L and 12R and the pinion gear 4 constitute a movement direction changing mechanism of the invention. The first movement direction M1 and the second movement direction M2 are set within the same plane.

Additionally, a left stopper 13L is provided between the left rod 11L and the left rack member 12L, and the left stopper 13L moves with the left rod 11L and the left rack member 12L. Moreover, a right stopper 13R is provided between the right rod 11R and the right rack member 12R, and the right stopper 13R moves with the right rod 11R and the right rack member 12R.

The left rod 11L, the left rack member 12L, and the left stopper 13L move up and down with the vertical movement of the left grip 10L if a driver or the like moves the left grip 10L up and down. Similarly, the right rod 11R, the right rack member 12R, and the right stopper 13R move up and down with the vertical movement of the right grip 10R.

Moreover, the guide member 2 is equipped with the guide plate 21, and an upper left stopper receiver 22LU, a lower left stopper receiver 22LL, an upper right stopper receiver 22RU, and a lower right stopper receiver 22RL are attached to the guide plate 21. Among these, the upper left stopper receiver 22LU and the lower left stopper receiver 22LL are arranged at upper and lower positions with the left stopper 13L interposed therebetween. Additionally, the upper right stopper receiver 22RU and the lower right stopper receiver 22RL are arranged at upper and lower positions with the right stopper 13R interposed therebetween.

Additionally, the guide plate 21 in the guide member 2 is connected to the input shaft 3 via a gear mechanism (not shown). For this reason, if the guide plate 21 rotates, the input shaft 3 is adapted to rotate with the rotation of the guide plate 21. Moreover, since the pinion gear 4 is attached to the tip portion of the input shaft 3, the input shaft 3 is adapted to rotate with the rotation of the pinion gear 4.

Moreover, reaction forces applied to the left and right grips 10L and 10R when the pinion gear 4 is rotating relative to the guide member 2 are made smaller than reaction forces applied to the left and right grips 10L and 10R when the steering member 1 and the guide member 2 are rotating around the input shaft 3 on the whole.

Next, the operation and effects of the steering device related to the present embodiment will be described. In the steering device S1 related to the present embodiment, the driver grips the left grip 10L and the right grip 10R and performs steering operation. Here, for example, in a case where a left turn is intended from the neutral position, the left grip 10L is moved downward and the right grip 10R is moved upward.

Figure 2:
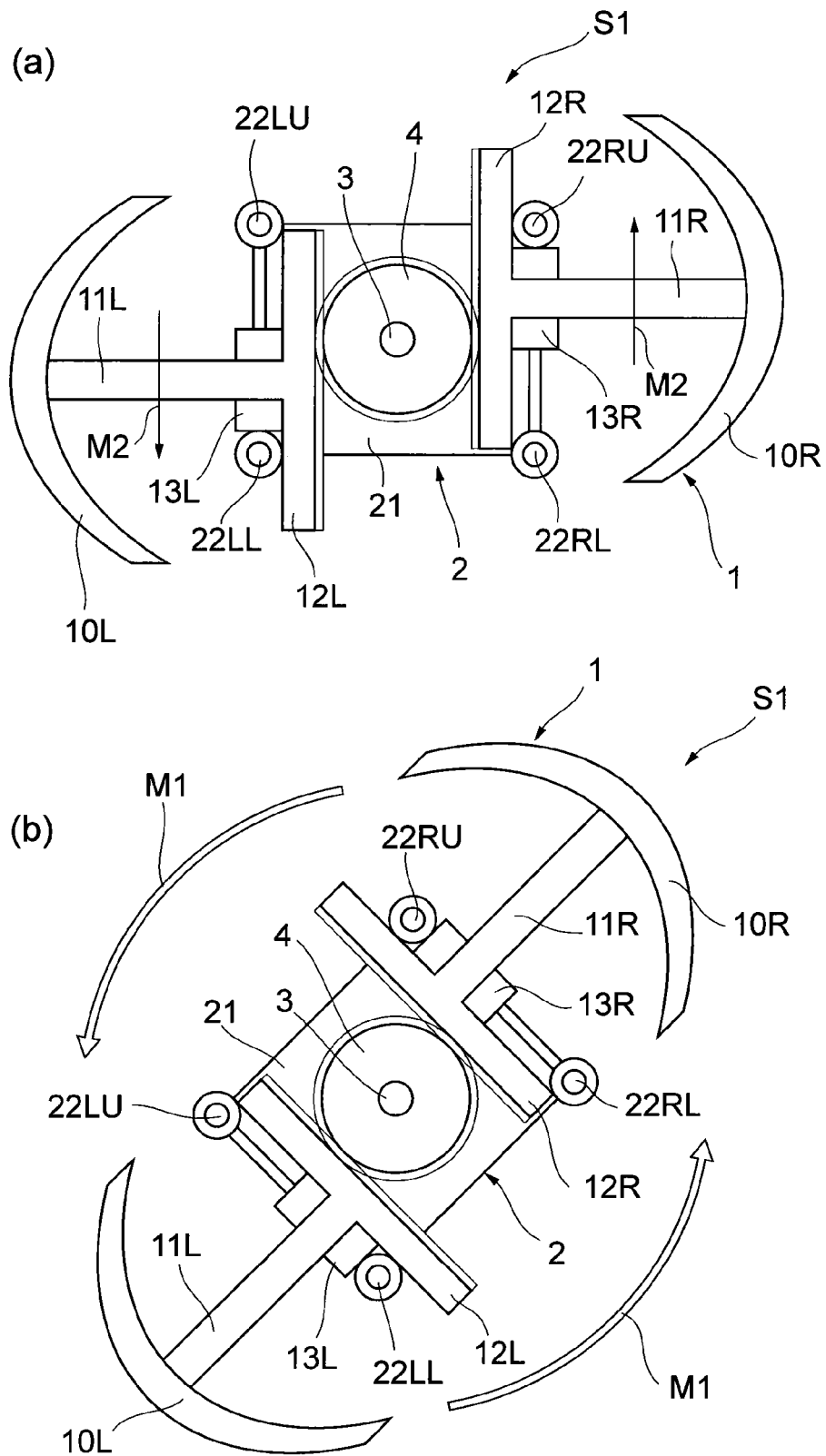
FIG. 2(a) is a front view showing a state where the steering device related to the first embodiment moves.
FIG. 2(b) is a front view showing movement following the movement of FIG. 2(a).

The left and right rods 11L and 11R and the left and right rack members 12L and 12R move downward and upward relative to the guide member 2, respectively, with the movement of the left and right grips 10L and 10R. If the left and right rack members 12L and 12R move downward and upward, respectively, as shown in FIG. 2(a), the pinion gear 4 that meshes with the left and right rack members 12L and 12R rotates in the counterclockwise direction around the input shaft 3, and rotates the input shaft 3 in the same direction. The steered wheels (not shown) are turned small in a left turn direction by the rotation of the input shaft 3.

Then, if the left and right grips 10L and 10R are further moved and the left and right stoppers 13L and 13R abut against the left and right stopper receivers 22LU, 22LL, 22RU, and 22RL, respectively, the movement of the left and right rods 11L and 11R and the left and right rack members 12L and 12R is regulated with respect to the guide member 2. Moreover, if the right grip 10R is moved upward and the left grip 10L is moved downward, since the left and right stoppers 13L and 13R abut against the left and right stopper receivers 22LU, 22LL, 22RU, and 22RL, respectively, as shown in FIG. 2(b), the overall steering member 1 including the left and right grips 10L and 10R rotates in the counterclockwise direction around the input shaft 3 with the guide member 2. The input shaft 3 is rotated in the same direction with the rotation of the guide member 2. The steered wheels (not shown) are largely turned in a left turn direction by the rotation of the input shaft 3.

In this way, in the steering device S1 related to the present embodiment, the left and right grips 10L and 10R are made movable in two directions of the vertical direction and the rotational direction around the input shaft 3 in turning the steered wheels. Here, the steering device S1 is formed with a movement direction changing mechanism equipped with the left and right rack members 12L and 12R and the pinion gear 4. For this reason, the movement in the vertical direction is integrated until the movement is changed to the rotational direction around the input shaft 3 and is transmitted to the steering system. Accordingly, the left and right grips 10L and 10R are made movable in the two directions of the vertical direction and the rotational direction around the input shaft 3, and a simple configuration can be provided.

Additionally, in the steering device S1 related to the present embodiment, a small steering angle of turning can be performed simply by moving the left and right grips 10L and 10R up and down, and when a large steering angle of turning is required, the rotation of the steering member 1 including the left and right grips 10L and 10R around the input shaft 3 is required. For this reason, the operation amount of the steering member 1 of the driver when a small steering angle of turning is performed can be made small, and a burden on the driver can be mitigated.

Moreover, in the steering device related to the present embodiment, the long left and right rods 11L and 11R are interposed between the left and right grips 10L and 10R and the left and right rack members 12L and 12R, respectively. For this reason, the distances from the axis when the left and right grips 10L and 10R are rotated around the input shaft 3 to force points increase. Accordingly, it is possible to contribute to improvement in the operativity at the time of a large steering angle. Additionally, the left and right grips 10L and 10R are cut off on the upper side thereof. For this reason, the visibility during straight traveling can be improved.

Additionally, in the above embodiment, the input shaft 3 rotates via the movement direction changing mechanism before the left and right stoppers 13L and 13R abut against the upper left stopper receiver 22LU and the lower right stopper receiver 22RL or the lower left stopper receiver 22LL and the upper right stopper receiver 22RU. Moreover, the input shaft 3 is rotated by the rotation of the steering member 1 including the left and right grips 10L and 10R and the guide member 2 after the left and right stoppers 13L and 13R abut against the upper left stopper receiver 22LU and the lower right stopper receiver 22RL or the lower left stopper receiver 22LL and the upper right stopper receiver 22RU. For this reason, the movement in the second movement direction M2 can be a moderate quantity and thereafter, and shifting to the movement in the first movement direction M2 can be made. Moreover, the change from the operation in the second movement direction M2 to the operation in the first movement direction M1 can be continuously and smoothly shifted.

Moreover, reaction forces applied to the left and right grips 10L and 10R when the pinion gear 4 is rotating relative to the guide member 2 are made smaller than reaction forces applied to the left and right grips 10L and 10R when the steering member 1 and the guide member 2 are rotating around the input shaft 3 on the whole. For this reason, eventually, since the operation in the second movement direction M2 is performed earlier than the first movement direction M1, the operation of the left and right grips 10L and 10R can be made small in the case of the small steering angle where the input shaft 3 is rotated small. Accordingly, the operation amount of the driver can be reduced and a burden on the driver can be mitigated.

Additionally, the second movement direction M2 is a tangential direction of a virtual circle that is a locus in the first movement direction M1, and the distances from the input shaft 3 in the second movement direction M2 and the first movement direction M1 are changed. For this reason, the driver operates the grips 10L and 10R small when performing a small steering angle of operation and operates the grips 10L and 10R largely when performing a large steering angle of operation. Accordingly, since the driver's operation becomes the operation suited to the steering angle, a burden when a small steering angle of operation is performed can be made small, and the amount of operation for the steering angle can be suited to driver's feeling.

Second Embodiment

Figure 3:
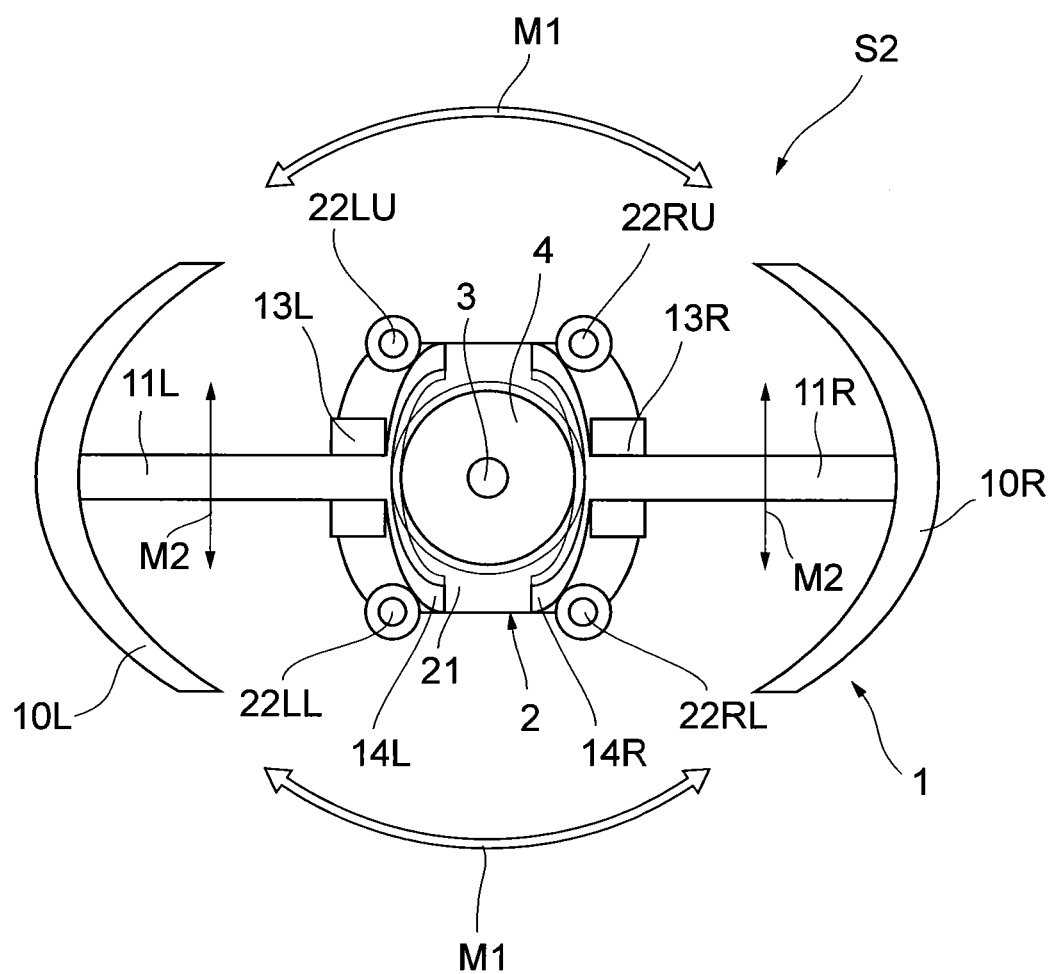
FIG. 3 is a front view of a steering device related to a second embodiment.

FIG. 3 is a front view of a steering device related to a second embodiment of the invention. As shown in FIG. 3, a steering device S2 related to the present embodiment is mainly different from the steering device S1 related to the above first embodiment in that left and right curved racks 14L and 14R are provided instead of the left and right rack members 12L and 12R in the steering member 1.

The left curved rack 14L is equipped with rack teeth arranged along a curved surface whose curvature is smaller than that of a circular shape. Similarly, the right curved rack 14R is equipped with rack teeth arranged along a curved surface whose curvature is smaller than that of a circular shape. Additionally, the curvatures in these rack gear teeth are the largest at central positions thereof, and decrease toward the outside.

Next, the operation and effects of the steering device S2 related to the present embodiment will be described. In the steering device S2 related to the present embodiment, similarly to the steering device S1 related to the above first embodiment, in a case the driver intends, for example, a left turn from the neutral position, the left and right grips 10L and 10R are moved in the second movement direction M2. Specifically, the left grip 10L is moved downward and the right grip 10R is moved upward.

Figure 4:
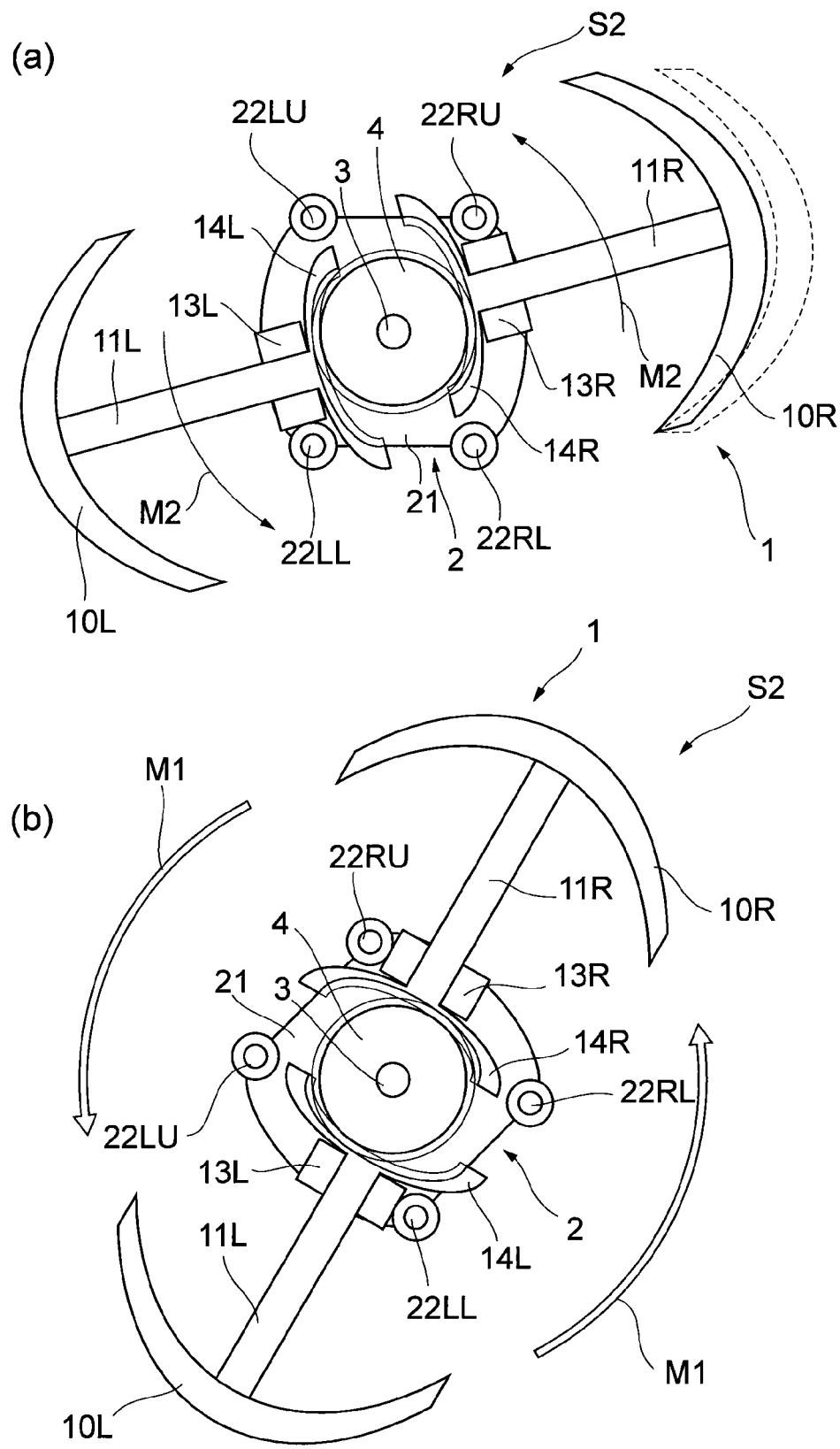
FIG. 4(a) is a front view showing a state where the steering device related to the second embodiment moves.
FIG. 4(b) is a front view showing movement following the movement of FIG. 4(a).

The left and right curved racks 14L and 14R move downward and upward relative to the guide member 2 while rotating, respectively, with the movement of the left and right grips 10L and 10R. At this time, as shown in FIG. 4(a), the pinion gear 4 that meshes with the left and right curved racks 14L and 14R rotates in the counterclockwise direction around the input shaft 3, and the input shaft 3 is rotated in the same direction. The steered wheels (not shown) are turned in the left turn direction by the rotation of the input shaft 3.

Then, if the left and right stoppers 13L and 13R abut against the left and right stopper receivers 22LU, 22LL, 22RU, and 22RL, respectively, the movement of the left and right grips 10L and 10R with respect to the guide member 2 is regulated. Moreover, if the right grip 10R is moved upward and the left grip 10L is moved downward, since the left and right stoppers 13L and 13R abut against the left and right stopper receivers 22LU, 22LL, 22RU, and 22RL, respectively, as shown in FIG. 4(b), the overall steering member 1 including the left and right grips 10L and 10R rotates in the counterclockwise direction around the input shaft 3 that is the first movement direction M1 with the guide member 2. The input shaft 3 is rotated in the same direction with the rotation of the guide member 2. The steered wheels (not shown) are largely turned in the left turn direction by the rotation of the input shaft 3.

In this way, in the steering device related to the present embodiment, the left and right grips 10L and 10R are made movable in the two directions of the vertical direction and the rotational direction around the input shaft 3 in turning the steered wheels. Here, the steering device S2 is formed with a movement direction changing mechanism equipped with the left and right curved racks 14L and 14R and the pinion gear 4. For this reason, the movement in the vertical direction is integrated until the movement is changed to the rotational direction around the input shaft 3 and is transmitted to the steering system. Accordingly, the left and right grips 10L and 10R are made movable in the two directions of the vertical direction and the rotational direction around the input shaft 3, and a simple configuration can be provided.

Additionally, in the steering device related to the present embodiment, the same working effects as the steering device S1 related to the above first embodiment are exhibited, and also the left and right curved racks 14L and 14R are provided. For this reason, if the left and right grips 10L and 10R are moved in order to perform a small steering angle of turning as shown in FIG. 4(a), the right grip 10R moves to a position slightly inside right above that is shown with a broken line and inclines so that an upper end portion thereof moves inward more than a lower end portion thereof. One left grip 10L inclines so that a lower end portion thereof moves inward more than an upper end portion thereof.

Accordingly, when the left and right stoppers 13L and 13R abut against the left and right stopper receivers 22LU, 22LL, 22RU, and 22RL, respectively, the angles of the left and right grips 10L and 10R are angles that are easily led to the angles of driver's wrists when a large steering angle of turning is performed afterwards. Hence, the steering device S2 when being shifted from a small steering angle to a large steering angle can be smoothly operated.

Third Embodiment

Figure 5:
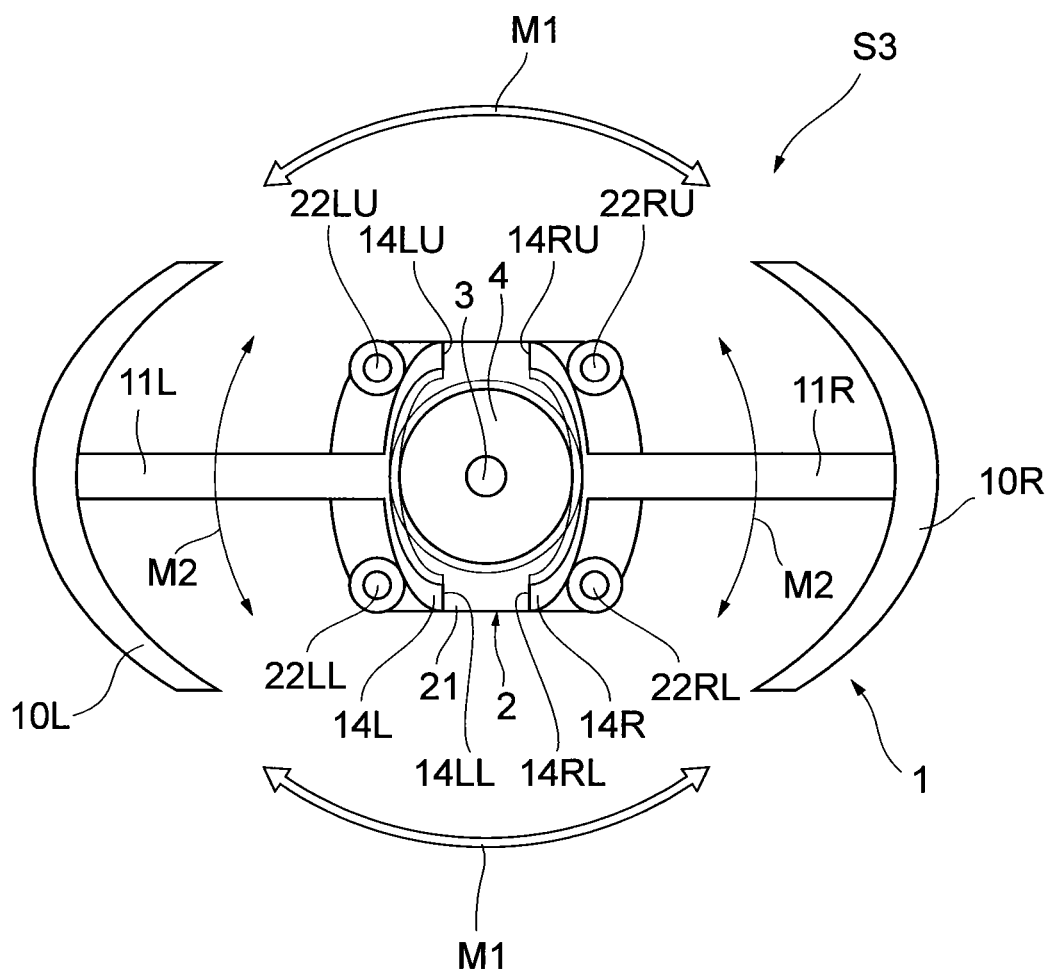
FIG. 5 is a front view of a steering device related to a third embodiment.

FIG. 5 is a front view of a steering device related to a third embodiment of the invention. As shown in FIG. 5, a steering device S3 related to the present embodiment is mainly different from the steering device S1 related to the above first embodiment in that the left and right curved racks 14L and 14R are provided and the left and right stoppers 13L and 13R are not provided, instead of the left and right rack members 12L and 12R in the steering member 1.

The left and right curved racks 14L and 14R related to the present embodiment have the same form as the above second embodiment. Additionally, both end portions of the left curved rack 14L are formed with left projection portions 14LU and 14LL, respectively, and both end portions of the right curved rack 14R are formed with right projection portions 14RU and 14RL, respectively. The projection portions 14LU, 14LL, 14RU, and 14RL function as stoppers.

Next, in the steering device S3 related to the present embodiment, similarly to the steering device S2 related to the above second embodiment, in a case the driver intends, for example, a left turn from the neutral position, the left and right grips 10L and 10R are moved in the second movement direction M2. Specifically, the left grip 10L is moved downward and the right grip 10R is moved upward.

Figure 6:
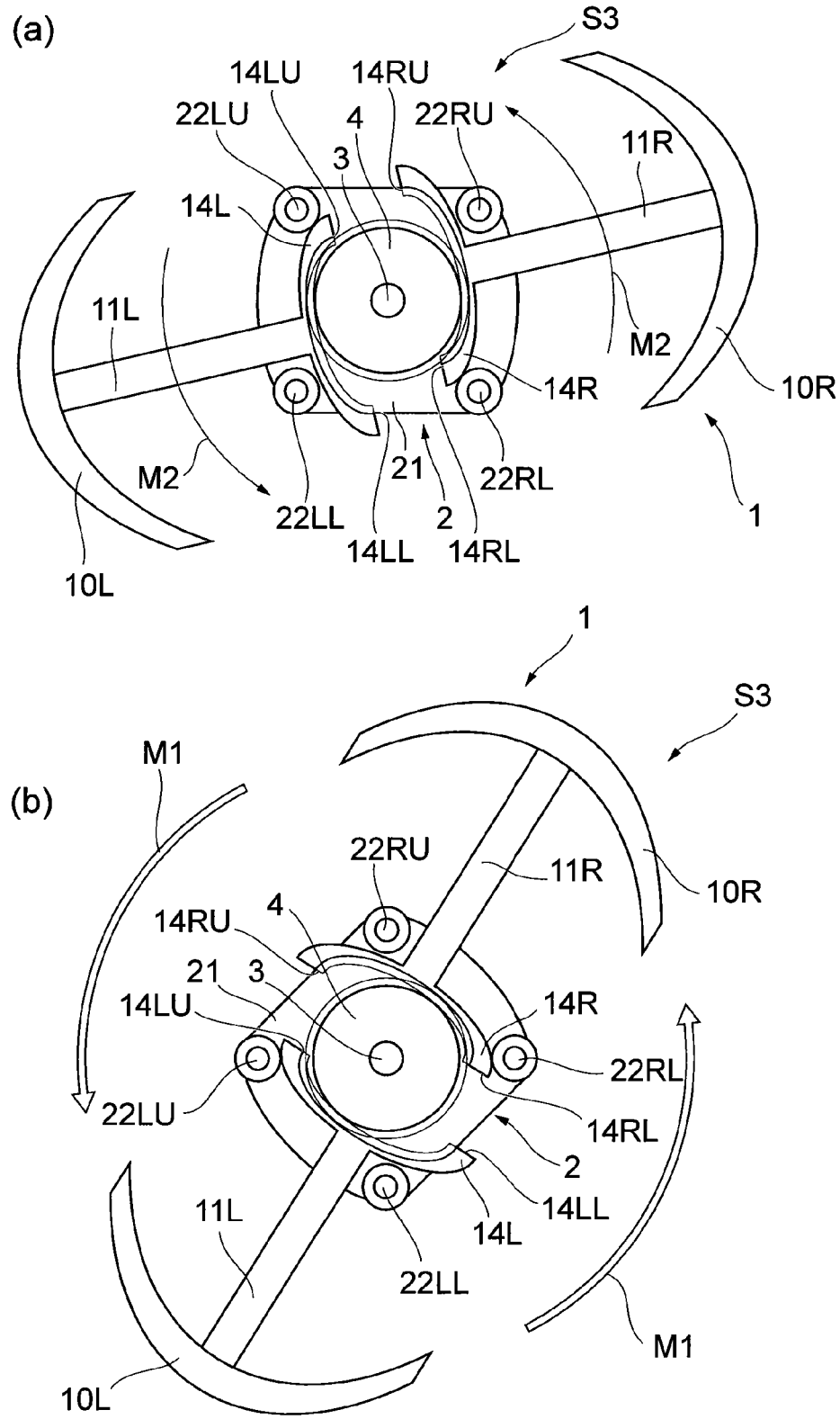
FIG. 6(a) is a front view showing a state where the steering device related to the third embodiment moves.
FIG. 6(b) is a front view showing movement following the movement of FIG. 6(a).

The left and right curved racks 14L and 14R move downward and upward relative to the guide member 2 while rotating, respectively, with the movement of the left and right grips 10L and 10R. At this time, as shown in FIG. 6(a), the pinion gear 4 that meshes with the left and right curved racks 14L and 14R rotates in the counterclockwise direction around the input shaft 3 that is the first movement direction M1, and the input shaft 3 is rotated in the same direction. The steered wheels (not shown) are turned in the left turn direction by the rotation of the input shaft 3.

Then, if the pinion gear 4 arrives at the position of the lower right projection portion 14RL of the right curved rack 14R and the position of the upper left projection portion 14LU of the left curved rack 14L, the pinion gear 4 bites into the projection portions 14RL and 14LU and rotation of the pinion gear 4 is suppressed. As the rotation of the pinion gear 4 is suppressed, the movement of the left and right grips 10L and 10R with respect to the guide member 2 is regulated.

Moreover, if the right grip 10R is moved upward and the left grip 10L is moved downward, since the rotation of the pinion gear 4 is suppressed, as shown in FIG. 6(b), the overall steering member 1 including the left and right grips 10L and 10R rotates in the counterclockwise direction around the input shaft 3 with the guide member 2. The input shaft 3 is rotated in the same direction with the rotation of the guide member 2. The steered wheels (not shown) are largely turned in the left turn direction by the rotation of the input shaft 3.

In this way, in the steering device S3 related to the present embodiment, the left and right grips 10L and 10R are made movable in the two directions of the vertical direction and the rotational direction around the input shaft 3 in turning the steered wheels. Here, the steering device S2 is formed with a movement direction changing mechanism equipped with the left and right curved racks 14L and 14R and the pinion gear 4. For this reason, the movement in the vertical direction is integrated until the movement is changed to the rotational direction around the input shaft 3 and is transmitted to the steering system. Accordingly, the left and right grips 10L and 10R are made movable in the two directions of the vertical direction and the rotational direction around the input shaft 3, and a simple configuration can be provided.

Additionally, the steering device S3 related to the present embodiment is adapted to shift from the movement in the second movement direction to the movement in the first movement direction by suppressing the rotation of the pinion gear 4. For this reason, since it is not necessary to separately provide members, such as stoppers, it is possible to contribute to reduction in the number of parts as many as that.

Fourth Embodiment

Figure 7:
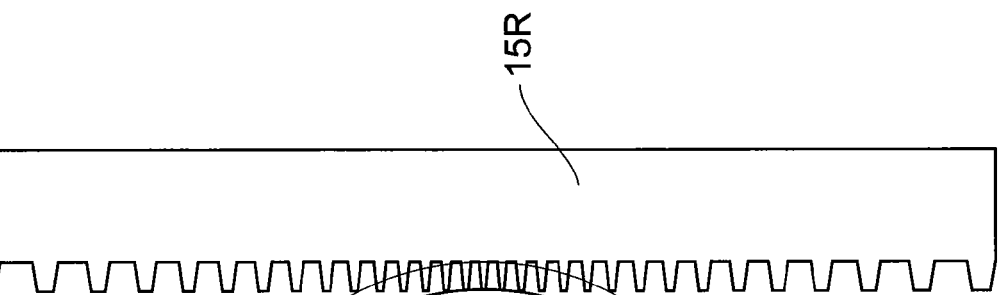
FIG. 7(a) is a front view of a modification of a steering device related to a fourth embodiment.
FIG. 7(b) is a side view of main parts thereof.
Figure 7:
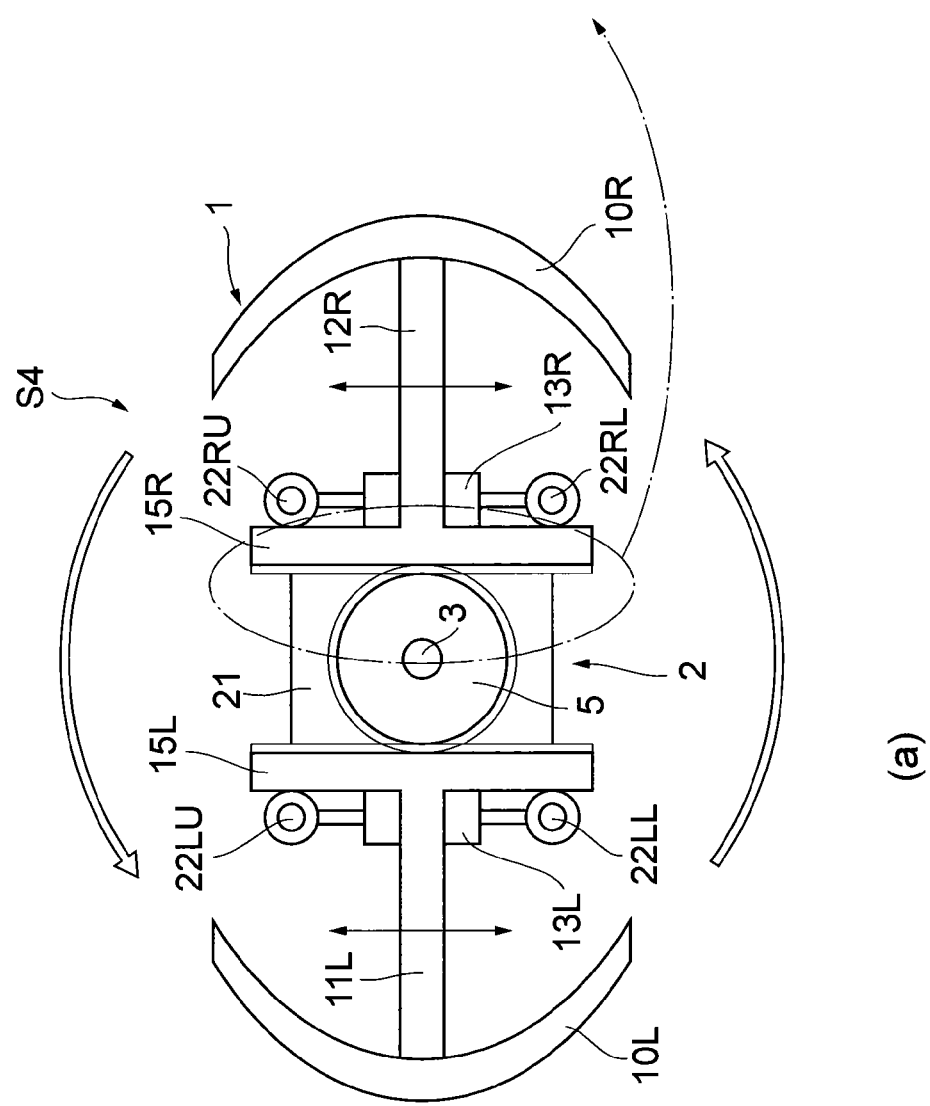

FIG. 7(a) is a front view of a modification of a steering device related to a fourth embodiment, and FIG. 7(b) is a side view of main parts thereof. As shown in FIG. 7, a steering device S4 related to the present embodiment is mainly different from the steering device S1 related to the above first embodiment in terms of the aspect of the pinion gear and the left and right rack members.

As shown in FIG. 7(a), the steering device S4 related to the present embodiment has the same member configuration as the steering device S1 related to the above first embodiment. Here, in a right rack member 15R related to the present embodiment, as shown in FIG. 7(b), the teeth of a middle portion thereof in the height direction is densely formed, and the teeth are sparsely formed gradually toward the outside in the vertical direction. Additionally, the teeth of the left rack member 15L are also similarly densely formed at a middle portion thereof, and are sparsely formed toward the outside in the vertical direction. Moreover, the teeth of a pinion gear 5 are densely and sparsely formed so as to mesh with the left and right rack members 15L and 15R.

In this way, a so-called gear ratio variable sliding mechanism is formed by the left and right rack members 15L and 15R and the pinion gear 5. Moreover, since the teeth at the middle positions of the left and right rack members 15L and 15R are dense, the gear ratio at the neutral position of the steering device S4 decreases and the gear ratio increases as being away from the neutral position.

Next, in the steering device S4 related to the present embodiment, similarly to the steering device S1 related to the above first embodiment, in a case the driver intends, for example, a left turn from the neutral position, the left and right grips 10L and 10R are moved in the second movement direction M2. Specifically, the left grip 10L is moved downward and the right grip 10R is moved upward.

The left and right rack members 15L and 15R move downward and upward relative to the guide member 2 while rotating, respectively, with the movement of the left and right grips 10L and 10R. At this time, as shown in FIG. 7(a), the pinion gear 5 that meshes with the left and right rack members 15L and 15R rotates in the counterclockwise direction around the input shaft 3, and the input shaft 3 is rotated in the same direction. The steered wheels (not shown) are turned small in the left turn direction by the rotation of the input shaft 3.

Then, if the left and right stoppers 13L and 13R abut against the left and right stopper receivers 22LU, 22LL, 22RU, and 22RL, respectively, the movement of the left and right grips 10L and 10R with respect to the guide member 2 is regulated. Moreover, if the right grip 10R is moved upward and the left grip 10L is moved downward, since the left and right stoppers 13L and 13R abut against the left and right stopper receivers 22LU, 22LL, 22RU, and 22RL, respectively, as shown in FIG. 7(b), the overall steering member 1 including the left and right grips 10L and 10R rotates in the counterclockwise direction around the input shaft 3 that is the first movement direction M1 with the guide member 2. The input shaft 3 is rotated in the same direction with the rotation of the guide member 2. The steered wheels (not shown) are largely turned in the left turn direction by the rotation of the input shaft 3.

In this way, in the steering device S4 related to the present embodiment, the left and right grips 10L and 10R are made movable in the two directions of the vertical direction and the rotational direction around the input shaft 3 in turning the steered wheels. Here, the steering device S4 is formed with a movement direction changing mechanism equipped with the left and right rack members 15L and 15R and the pinion gear 5. For this reason, the movement in the vertical direction is integrated until the movement is changed to the rotational direction around the input shaft 3 and is transmitted to the steering system. Accordingly, the left and right grips 10L and 10R are made movable in the two directions of the vertical direction and the rotational direction around the input shaft 3, and a simple configuration can be provided.

Moreover, in the steering device S4 related to the present embodiment, the gear ratio variable sliding mechanism is formed by the left and right rack members 15L and 15R and the pinion gear 5, the gear ratio is small at the neutral position, and the gear ratio increases as being apart from the neutral position. For this reason, a feeling of discomfort given to the driver can be reduced when the movement direction is changed from the second movement direction M2 to the first movement direction M1 or from the first movement direction M1 to the second movement direction M2. Moreover, fine adjustment of the steering angle in the vicinity of the neutral position can be easily performed, and the steering angle can be easily increased at a position apart from the neutral position.

Fifth Embodiment

Figure 8:
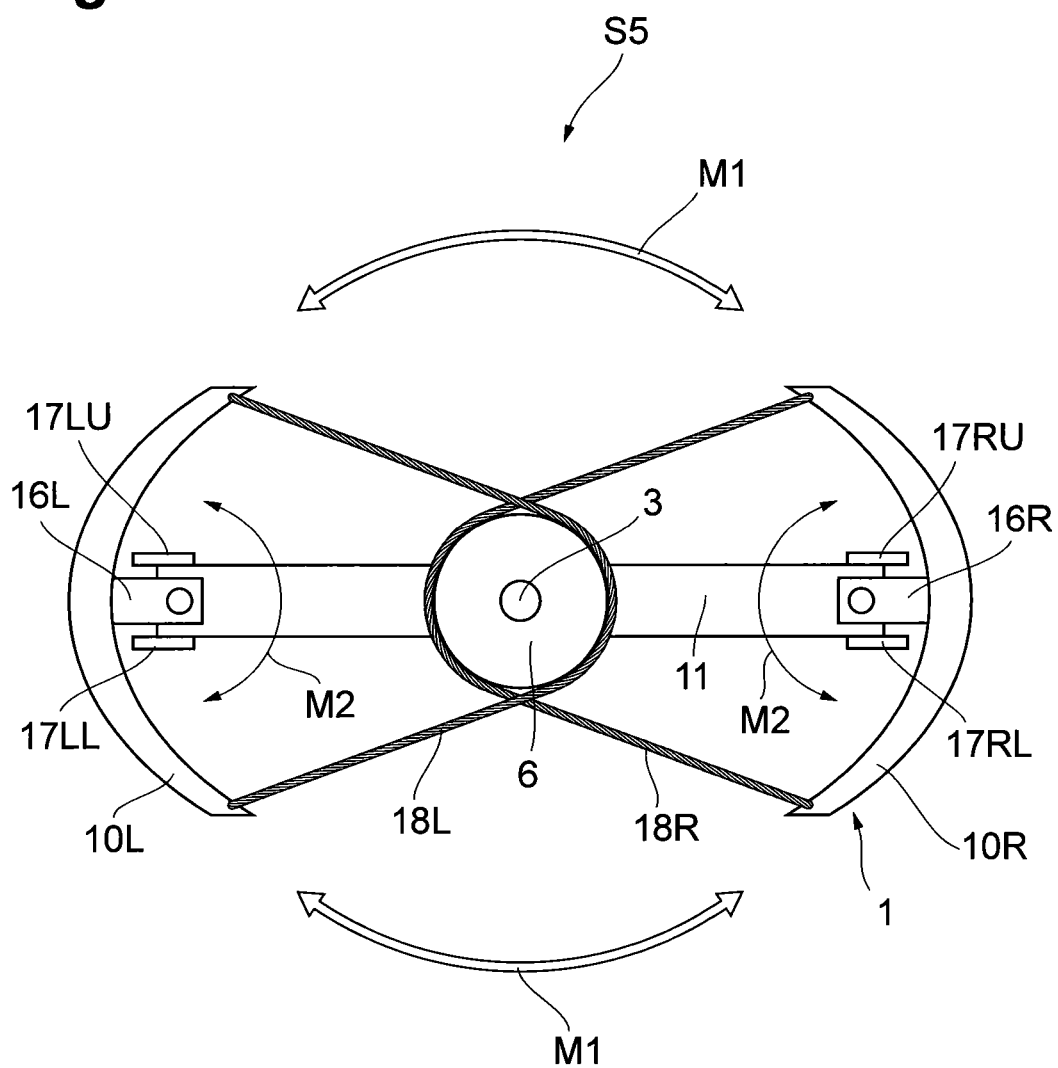
FIG. 8 is a front view of a steering device related to a fifth embodiment.

FIG. 8 is a front view of a steering device related to a fifth embodiment of the invention. As shown in FIG. 8, a steering device S5 related to the present embodiment is equipped with the steering member 1, the input shaft 3, and a cylindrical transmission member 6. The cylindrical transmission member 6 is a tubular member that is made rotatable around the input shaft 3, and as the cylindrical transmission member 6 rotates around the input shaft 3, the input shaft 3 also rotates. As the input shaft 3 rotates, the rotation of the input shaft 3 is transmitted to the steering system of the invention, and the steered wheels (not shown) in the vehicle are turned.

The steering member 1 in the steering device S5 is equipped with the left grip 10L and the right grip 10R. The left and right grips 10L and 10R all have a substantially crescent shape and are enabled to operate independently from each other. Additionally, a left end portion of a left rocking rod 16L is fixed to a substantially middle portion of the left grip 10L in the height direction, and a left end portion of a rod 11 is attached to a right end portion of the left rocking rod 16L. Here, the left rocking rod 16L is rockably attached to the rod 11.

On the other hand, a right end portion of a right rocking rod 16R is fixed to a substantially middle portion of the right grip 10R in the height direction, and a right end portion of the rod 11 is attached to a left end portion of the right rocking rod 16R. Additionally, the right rocking rod 16R is rockably attached to the rod 11. Moreover, a longitudinal central portion of the rod 11 is coupled to the input shaft 3. For this reason, the rod 11 is made rotatable around the input shaft 3, and if the rod 11 rotates, the input shaft 3 rotates with the rotation of the rod 11.

Moreover, a left end portion in the rod 11 is provided with an upper left stopper 17LU and a lower left stopper 17LL that regulate the rocking range of the left rocking rod 16L. The left rocking rod 16L is made rockable with the left end portion in the rod 11 as an axis, and the movement of the left rocking rod in the rocking direction is regulated by abutting on the left stopper 17LU and 17LL. Similarly, a right end portion in the rod 11 is provided with an upper right stopper 17RU and a lower right stopper 17RL that regulate the rocking range of the right rocking rod 16R. The left and right stoppers 17LU, 17LL, 17RU, and 17RL are respectively provided on both sides above and below the rod 11. For this reason, the left and right stoppers 17LU, 17LL, 17RU, and 17RL regulate the rocking of the left and right rocking rods 16L and 16R in up-down and left-right directions.

Additionally, one end portion of a left wire member 18L is connected to the upper end portion of the left grip 10L, and the other end portion of the left wire member 18L is connected to the lower end portion of the left grip 10L. The left wire member 18L is wound around the cylindrical transmission member 6. Moreover, one end portion of a right wire member 18R is connected to the upper end portion of the right grip 10R, and the other end portion of the right wire member 18R is connected to the lower end portion of the right grip 10R. The right wire member 18R is wound around the cylindrical transmission member 6.

For this reason, if the left and right grips 10L and 10R are operated in a state where the rod 11 does not rotate with respect to the input shaft 3, the left and right rocking rods 16L and 16R rocks with respect to the rod 11. Additionally, the left and right grips 10L and 10R are also rocked with the rocking of the left and right rocking rods 16L and 16R. The left and right wire members 18L and 18R wound around the cylindrical transmission member 6 rotates the cylindrical transmission member 6 with a frictional force through the rocking of the left and right grips 10L and 10R. As the cylindrical transmission member 6 rotates, the input shaft 3 is adapted to rotate.

Here, if a frictional force applied to the steering device S5 when the left and right rocking rods 16L and 16R rock with respect to the rod 11 is compared with a frictional force applied to the steering device S5 when the rod 11 rotates with respect to the input shaft 3, the frictional force applied to the steering device S5 when the rod 11 rotates with respect to the input shaft 3 is smaller. For this reason, when the left and right grips 10L and 10R are operated from the neutral position, the left rocking rod 16L and the right rocking rod 16R are adapted to state rocking with respect to the rod 11 before the cylindrical transmission member 6 rotates. Also, the left and right rocking rods 16L and 16R rotate when the left and right grips 10L and 10R are further operated after the left and right rocking rods 16L and 16R abut against the left and right stopper 17LU, 17LL, 17RU, and 17RL, respectively.

Next, the operation and effects of the steering device S5 related to the present embodiment will be described. In the steering device S5 related to the present embodiment, similarly to the steering device S1 related to the above first embodiment, in a case the driver intends, for example, a left turn from the neutral position, the left grip 10L is moved downward and the right grip 10R is moved upward.

Figure 9:
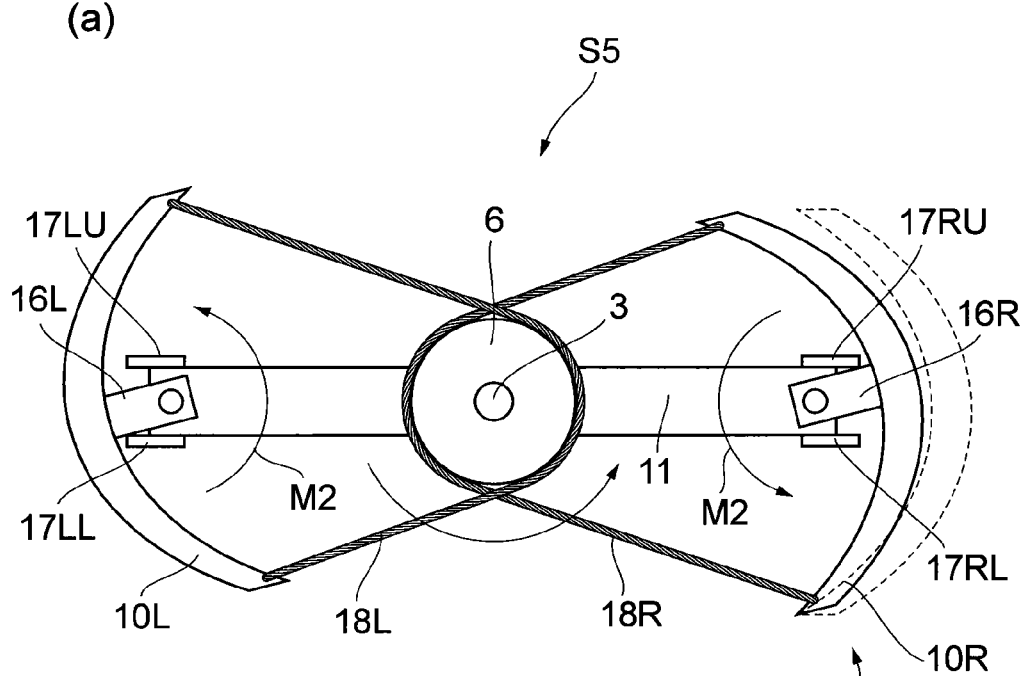
FIG. 9(a) is a front view showing a state where the steering device related to the fifth embodiment moves.
FIG. 9(b) is a front view showing movement following the movement of FIG. 9(a).
Figure 9:
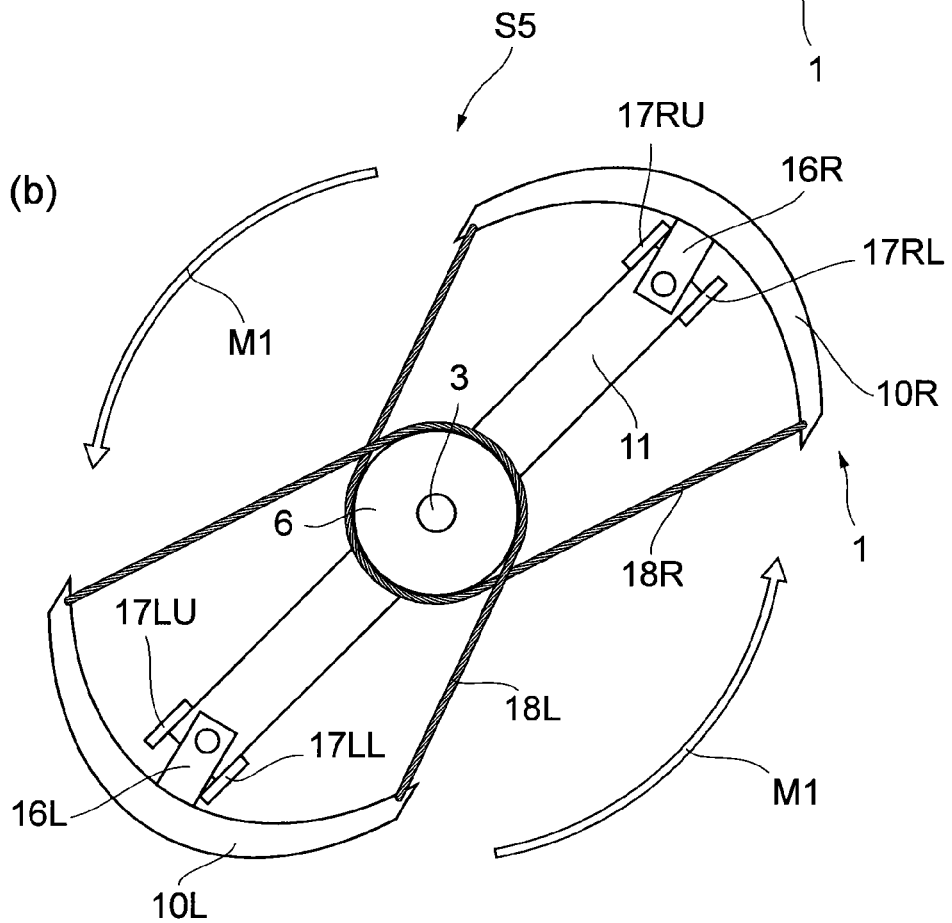

With the movement of the left and right grips 10L and 10R, as shown in FIG. 9(a), the left and right rocking rods 16L and 16R rock around rocking shafts at the end portions of the rod 11 that is the second movement direction M2. The left and right grips 10L and 10R are also rocked around the rocking shafts of the left and right rocking rods 16L and 16R by the rocking of the left and right rocking rods 16L and 16R.

Here, through the rocking of the left and right grips 10L and 10R, the cylindrical transmission member 6 rotates in the counterclockwise direction via the left and right wire members 18L and 18R, and the input shaft 3 rotates with the rotation of the cylindrical transmission member 6. As a result, the steered wheels (not shown) are turned small in the left turn direction. At this time, since the driver can operate the left and right grips 10R and 10L simply by the movement of his/her wrist, a burden to driver's operation can be made small.

Then, if the left and right rocking rods 16L and 16R abut against the left and right stopper 17LU, 17LL, 17RU, and 17RL, respectively, the movement of the left and right rocking rods 16L and 16R with respect to the rod 11 is regulated. Thereafter, if the right grip 10R is further moved upward and the left grip 10L is further moved downward, since the left and right rocking rods 16L and 16R abut against the left and right stoppers 17LU, 17LL, 17RU, and 17RL, respectively, as shown in FIG. 9(b), the overall steering member 1 including the rod 11 rotates in the counterclockwise direction around the input shaft 3 that is the first movement direction M1. The input shaft 3 is rotated in the same direction with the rotation of the rod 11. The steered wheels (not shown) are largely turned in the left turn direction by the rotation of the input shaft 3.

In this way, in the steering device related to the present embodiment, the left and right grips 10L and 10R are made movable in the two directions of the direction around the rocking shafts of the left and right rocking rods 16L and 16R and the rotational direction around the input shaft 3 in turning the steered wheels. Here, the steering device S5 is formed with a movement direction changing mechanism equipped with the left and right rocking rods 16L and 16R, the left and right wire members 18L and 18R, and the cylindrical transmission member 6.

For this reason, the movement in the direction around the rocking shafts of the left and right rocking rods 16L and 16R is integrated until the movement is changed to the rotational direction around the input shaft 3 and is transmitted to the steering system. Accordingly, the left and right grips 10L and 10R are made movable in the two directions of the direction around the rocking shafts of the left and right rocking rods 16L and 16R and the rotational direction around the input shaft 3, and a simple configuration can be provided.

Additionally, in the steering device related to the present embodiment, the same working effects as the steering device S1 related to the above first embodiment are exhibited, and also the movement of the left and right grips 10L and 10R for performing a small steering angle of turning can be made to be the same as that of the steering device S2 related to the above second embodiment. For this reason, angles that are easily led to the angles of the driver wrists when being shifted from a small steering angle to a large steering angle are given. Hence, the steering device S5 when being shifted from a small steering angle to a large steering angle can be smoothly operated.

Moreover, since the left and right grips 10L and 10R are greatly turned when a large steering angle of turning is performed, the driver can be made to realize a feeling of performing a large steering angle of turning. In this way, since operation aspects when the left and right grips 10L and 10R are operated to perform a large steering angle of turning and when the left and right grips are operated to perform a small steering angle of turning can be changed, the driver's operation can be made easy.

Sixth Embodiment

Figure 10:
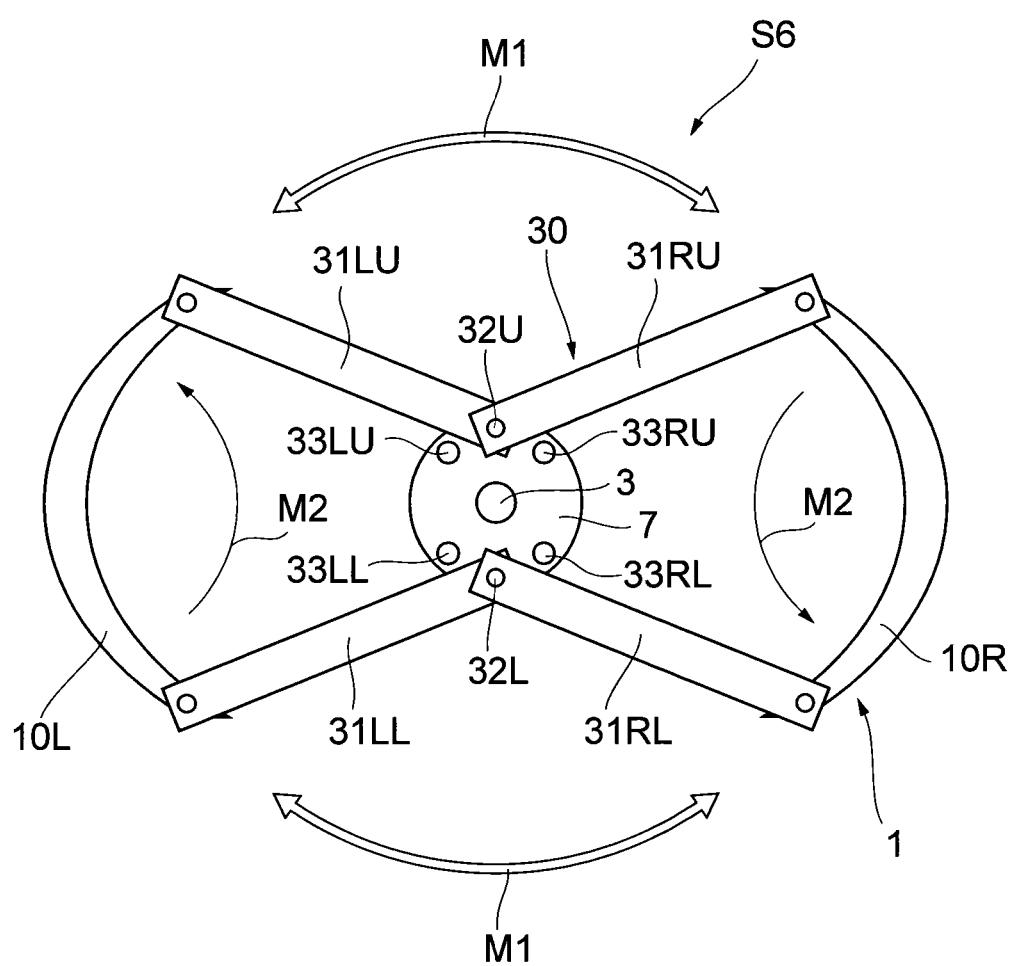
FIG. 10 is a front view of a steering device related to a sixth embodiment.

FIG. 10 is a front view of a steering device related to a sixth embodiment of the invention. As shown in FIG. 10, a steering device S6 related to the present embodiment is equipped with the steering member 1, the input shaft 3, and a disc-like transmission member 7. The disc-like transmission member 7 is a disc-like member that is made rotatable around the input shaft 3, and as the disc-like transmission member 7 rotates around the input shaft 3, the input shaft 3 also rotates around the input shaft 3. As the input shaft 3 rotates, the rotation of the input shaft 3 is transmitted to the steering system of the invention, and the steered wheels (not shown) in the vehicle are turned.

The steering member 1 in the steering device S6 is equipped with the left grip 10L and the right grip 10R. The left and right grips 10L and 10R all have a substantially crescent shape and are enabled to operate independently from each other. Additionally, a rocking link mechanism 30 is provided between the left grip 10L and the right grip 10R. The rocking link mechanism 30 is equipped with an upper left link 31LU, an upper right link 31RU, a lower left link 31LL, and a lower right link 31RL.

One end portion of the upper left link 31LU is rockably attached to the upper end portion of the left grip 10L, and one end portion of the upper right link 31RU is rockably attached to the upper end portion of the right grip 10R. Additionally, one end portion of the lower left link 31LL is rockably attached to the lower end portion at the left grip 10L, and one end portion of the lower right link 31RL is rockably attached to the lower end portion in the right grip 10R.

Moreover, an upper rocking shaft 32U and a lower rocking shaft 32L are erected from the surface of the disc-like transmission member 7. The other end portion of the upper left link 31LU and the other end portion of the upper right link 31RU are rockably connected to each other by the upper rocking shaft 32U, the other end portion of the lower left link 31LL and the other end portion of the lower right link 31RL are rockably connected to each other by the lower rocking shaft 32L.

Additionally, an upper left stopper 33LU, an upper right stopper 33RU, a lower left stopper 33LL, and a lower right stopper 33RL are provided on the surface in the input shaft 3. The upper left stopper 33LU regulates the downward movement of the upper left link 31LU, and the upper right stopper 33RU regulates the downward movement of the upper right link 31RU. Additionally, the lower left stopper 33LL regulates the upward movement of the lower left link 31LL, and the lower right stopper 33RL regulates the upward movement of the lower right link 31RL.

For this reason, if the left and right grips 10L and 10R are operated upward and downward from the neutral state, the rocking link mechanism 30 operates. The disc-like transmission member 7 rotates around the input shaft 3 with the operation of the rocking link mechanism 30, and the input shaft 3 rotates with the disc-like transmission member 7. Additionally, if the links 31LU, 31LL, 31RU, and 31RL abut against the stoppers 33LU, 33LL, 33RU, and 33RL, respectively, with the operation of the rocking link mechanism 30, the links 31LU, 31LL, 31RU, and 31RL pushes out the stopper 33LU, 33LL, 33RU, and 33RL, respectively, whereby the input shaft 3 rotates directly.

Next, the operation and effects of the steering device S6 related to the present embodiment will be described. In the steering device S6 related to the present embodiment, similarly to the steering device S1 related to the above first embodiment, in a case the driver intends, for example, a left turn from the neutral position, the left grip 10L is moved downward and the right grip 10R is moved upward.

Figure 11:
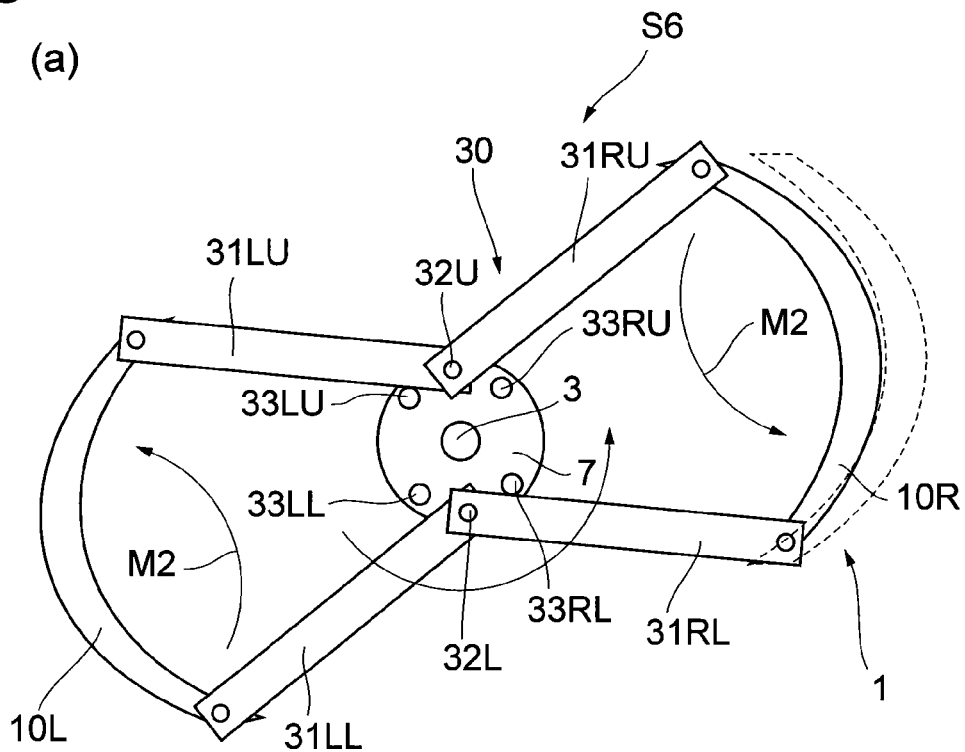
FIG. 11(a) is a front view showing a state where the steering device related to the sixth embodiment moves.
FIG. 11(b) is a front view showing movement following the movement of FIG. 11(a).
Figure 11:
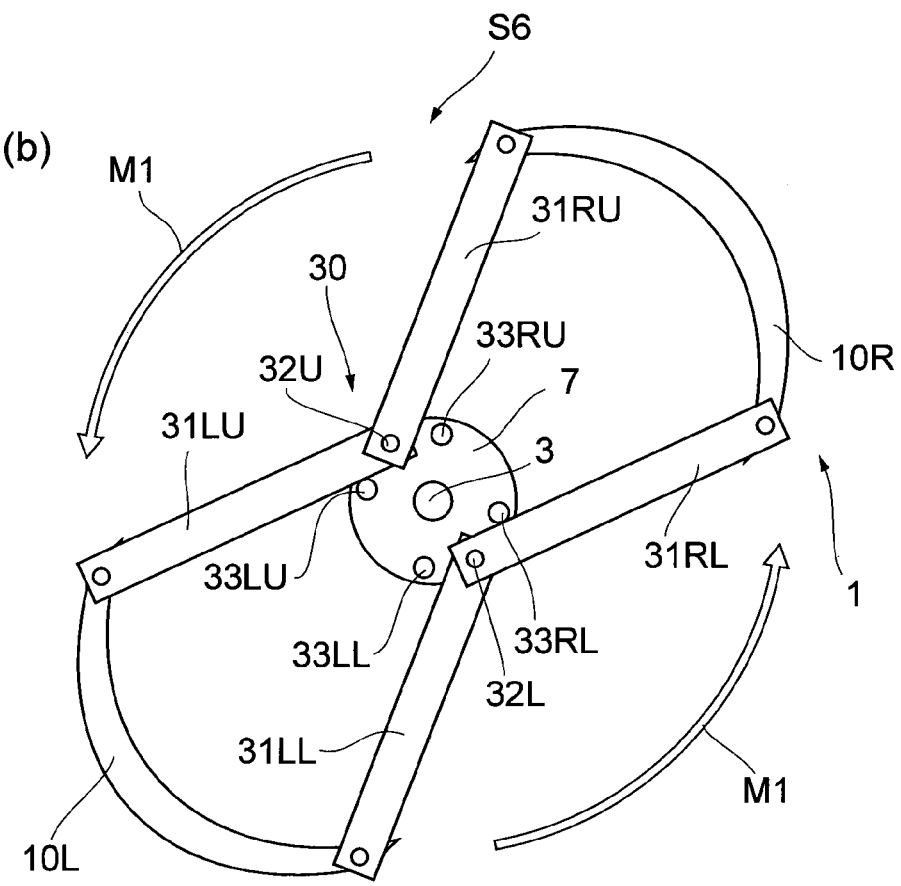

With the movement of the left and right grips 10L and 10R, as shown in FIG. 11(a), the rocking link mechanism 30 operates. The rocking link mechanism 30 moves the upper end of the left grip 10L in an upper left direction and moves the lower end of the left grip in a lower right direction, and moves the upper end of the right grip 10R in the upper left direction and moves the lower end of the right grip in the lower right direction. At this time, the moving direction of the left and right grips 10L and 10R is the second movement direction M2.

The rocking link mechanism 30 changes the movement direction of the left and right grips 10L and 10R to the first movement direction M1 in the disc-like transmission member 7. For this reason, the disc-like transmission member 7 has such operation that the upper rocking shaft 32U moves in the lower left direction, and the lower rocking shaft 32L moves in the upper right direction. Here, through the operation of the upper rocking shaft 32U and the lower rocking shaft 32L, the disc-like transmission member 7 rotates in the counterclockwise direction, and the input shaft 3 rotates with the rotation of the disc-like transmission member 7. As a result, the steered wheels (not shown) are turned small in the left turn direction. At this time, since the driver can operate the left and right grips 10R and 10L simply by the movement of his/her wrist, a burden to driver's operation can be made small.

Also, if the links 31LU and 31RL abut against the stoppers 33LU and 33RL, respectively, as shown in FIG. 11(b), the links 31LU and 31RL push out the stopper 33LU and 33RL, respectively. The input shaft 3 is directly rotated in the counterclockwise rotation that is the first movement direction M1 by the push-out force. The steered wheels (not shown) are largely turned in the left turn direction by the rotation of the input shaft 3.

In this way, in the steering device related to the present embodiment, the left and right grips 10L and 10R are made movable in the two directions of the second movement direction M2 and the first movement direction M1 in turning the steered wheels. Here, the steering device S6 is formed with a movement direction changing mechanism equipped with the links 31LU, 31LL, 31RU, and 31RL and the stopper 33LU, 33LL, 33RU, and 33RL in the rocking link mechanism 30.

For this reason, the movement in the second movement direction M2 is integrated until the movement is changed to the first movement direction M1 and is transmitted to the steering system. Accordingly, the movement in the two directions of the second movement direction M2 and the first movement direction M1 is possible, and a simple configuration can be provided.

Additionally, in the steering device related to the present embodiment, the same working effects as the steering device S1 related to the above first embodiment are exhibited, and also the movement of the left and right grips 10L and 10R for performing a small steering angle of turning can be made to be the same as that of the steering device S2 related to the above second embodiment. For this reason, angles that are easily led to the angles of the driver wrists when being shifted from a small steering angle to a large steering angle are given. Hence, the steering device S6 when being shifted from a small steering angle to a large steering angle can be smoothly operated.

Moreover, since the left and right grips 10L and 10R are greatly turned when a large steering angle of turning is performed, the driver can be made to realize a feeling of performing a large steering angle of turning. In this way, since operation aspects when the left and right grips 10L and 10R are operated to perform a large steering angle of turning and when the left and right grips are operated to perform a small steering angle of turning can be changed, the driver's operation can be made easy.

Seventh Embodiment

Figure 12:
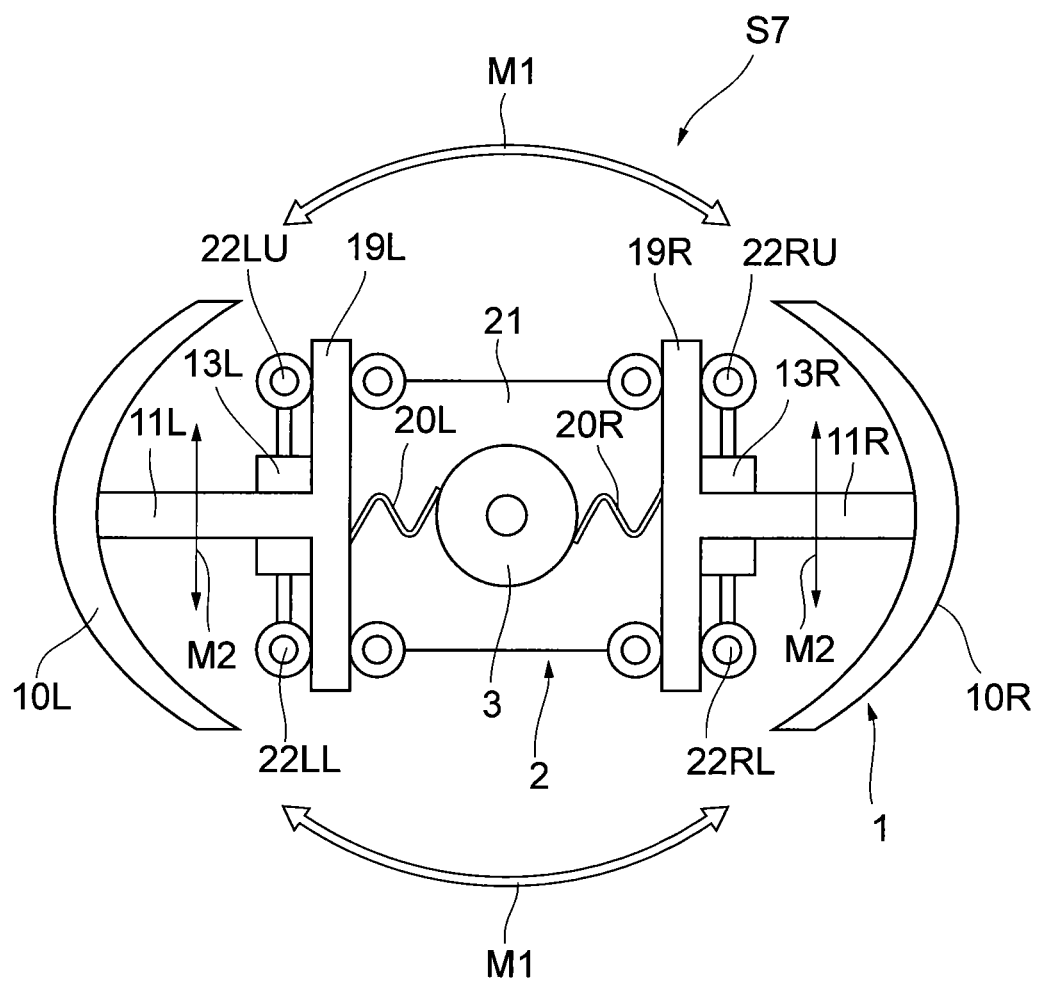
FIG. 12 is a front view of a steering device related to a seventh embodiment.

FIG. 12 is a front view of a steering device related to a seventh embodiment of the invention. As shown in FIG. 12, a steering device S7 related to the present embodiment is mainly different from the steering device S1 related to the above first embodiment in that left and right slider members 19L and 19R and left and right rotation transmission members 20L and 20R are provided and also the pinion gear 4 is not provided, instead of the left and right rack members 12L and 12R in the steering member 1.

As shown in FIG. 12, the steering device S7 related to the present embodiment, similarly to the above first embodiment, is equipped with the steering member 1, the guide member 2, and the input shaft 3. The steering member 1, similarly to the above first embodiment, is equipped with the left and right grips 10L and 10R, the left and right rods 11L and 11R, and the left and right stoppers 13L and 13R.

Additionally, the left slider member 19L is fixed to the right end portion of the left rod 11L, and the right slider member 19R is fixed to the left end portion of the right rod 11R. The left and right slider members 19L and 19R has a configuration in which the rack teeth are removed from the left and right rack members 12L and 12R in the steering device S1 related to the first embodiment, are guided by a sliding mechanism (not shown) and are enabled to move in the vertical direction.

Moreover, a left rotation transmission member 20L is attached to the left slider member 19L, and a right rotation transmission member 20R is attached to the right slider member 19R. The left and right rotation transmission members 20L and 20R are formed from flat springs, and are all connected to the input shaft 3. The left and right rotation transmission members 20L and 20R constitute restoring force imparting means of the invention.

Next, the operation and effects of the steering device S7 related to the present embodiment will be described. In the steering device S7 related to the present embodiment, similarly to the steering device S1 related to the above first embodiment, in a case the driver intends, for example, a left turn from the neutral position, the left and right grips 10L and 10R are moved in the second movement direction M2. Specifically, the left grip 10L is moved downward and the right grip 10R is moved upward.

Figure 13:
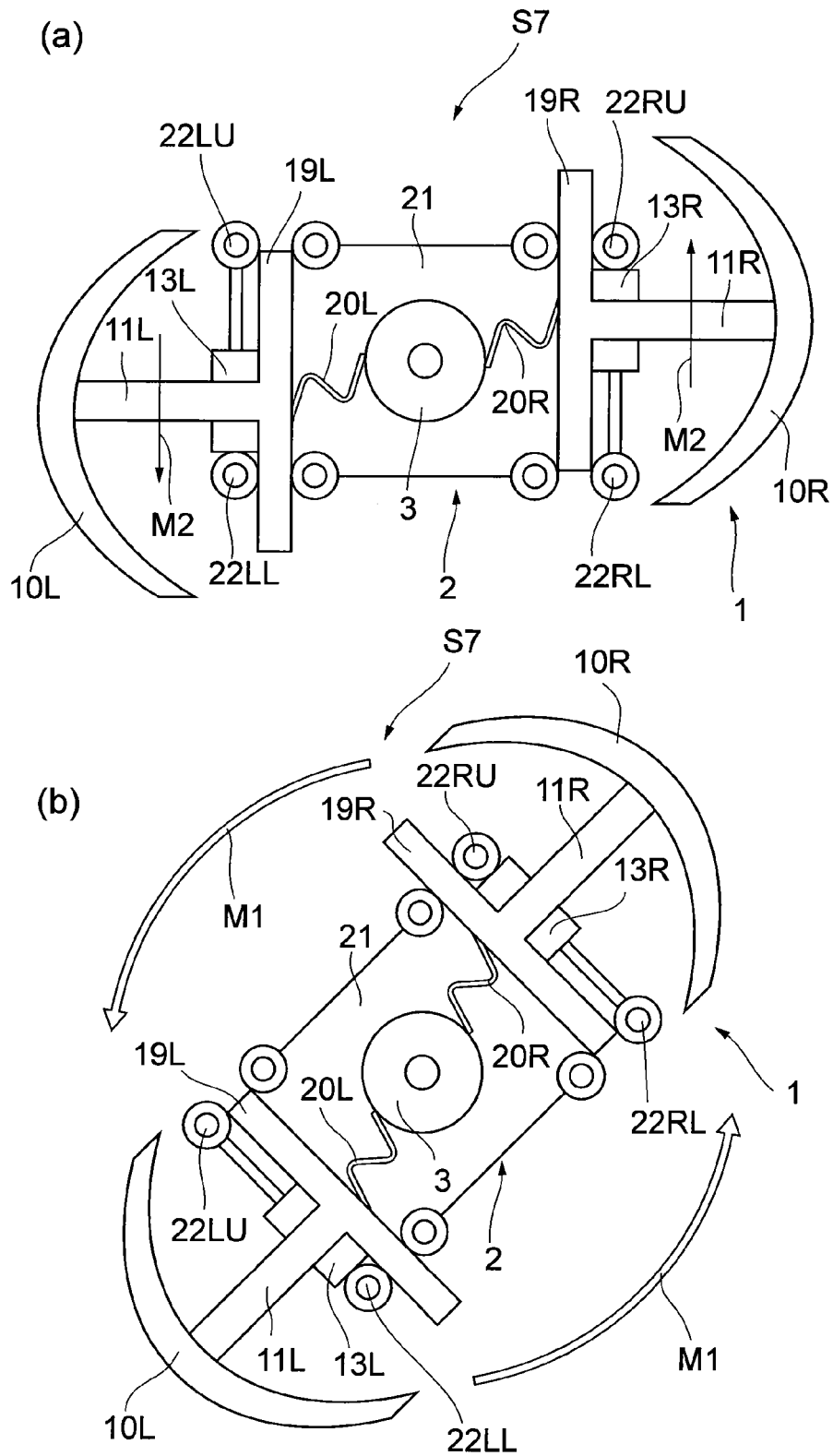
FIG. 13(a) is a front view showing a state where the steering device related to the seventh embodiment moves.
FIG. 13(b) is a front view showing movement following the movement of FIG. 13(a).

The left and right rods 11L and 11R and the left and right slider members 19L and 19R move downward and upward relative to the guide member 2, respectively, with the movement of the left and right grips 10L and 10R. If the left and right slider members 19L and 19R move downward and upward, respectively, as shown in FIG. 13(a), the left and right rotation transmission members 20L and 20R move downward and upward, respectively, and the left and right grips 10L and 10R and the input shaft 3 that is the first movement direction M1 is rotated in the counterclockwise direction. The steered wheels (not shown) are turned small in the left turn direction by the rotation of the input shaft 3.

Then, if the left and right grips 10L and 10R are further moved and the left and right stoppers 13L and 13R abut against the lower left stopper receiver 22LL and the upper right stopper receiver 22RU, respectively, the movement of the left and right rods 11L and 11R with respect to the guide member 2 is regulated. Moreover, if the right grip 10R is moved upward and the left grip 10L is moved downward, since the left and right stoppers 13L and 13R abut against the lower left stopper receiver 22LL and the upper right stopper receiver 22RU, respectively, as shown in FIG. 13(b), the overall steering member 1 including the left and right grips 10L and 10R rotates in the counterclockwise direction around the input shaft 3 that is the first movement direction M1 with the guide member 2. The input shaft 3 is rotated in the same direction with the rotation of the guide member 2. The steered wheels (not shown) are largely turned in the left turn direction by the rotation of the input shaft 3.

In this way, in the steering device S7 related to the present embodiment, the left and right grips 10L and 10R are made movable in the two directions of the vertical direction and the rotational direction around the input shaft 3 in turning the steered wheels. Here, the steering device S7 is formed with a movement direction changing mechanism equipped with the left and right slider members 19L and 19R and the left and right rotation transmission members 20L and 20R. For this reason, the movement in the vertical direction is integrated until the movement is changed to the rotational direction around the input shaft 3 and is transmitted to the steering system. Accordingly, the left and right grips 10L and 10R are made movable in the two directions of the vertical direction and the rotational direction around the input shaft 3, and a simple configuration can be provided. Additionally, generation of teeth knocking sound that occurs in a case where a rack-and-pinion mechanism or the like is used can be prevented.

Moreover, in the steering device S7 related to the present embodiment, the left and right rotation transmission members 20L and 20R are formed from flat springs, and urges the input shaft 3 in the direction of the neutral position. For this reason, the rigidity around the shaft when the operation in the second movement direction is performed can be made high. Moreover, when the left and right grips 10L and 10R are operated upward and downward to perform steering operation, the left and right grips 10L and 10R can be easily returned to the neutral position.

Eighth Embodiment

Figure 14:
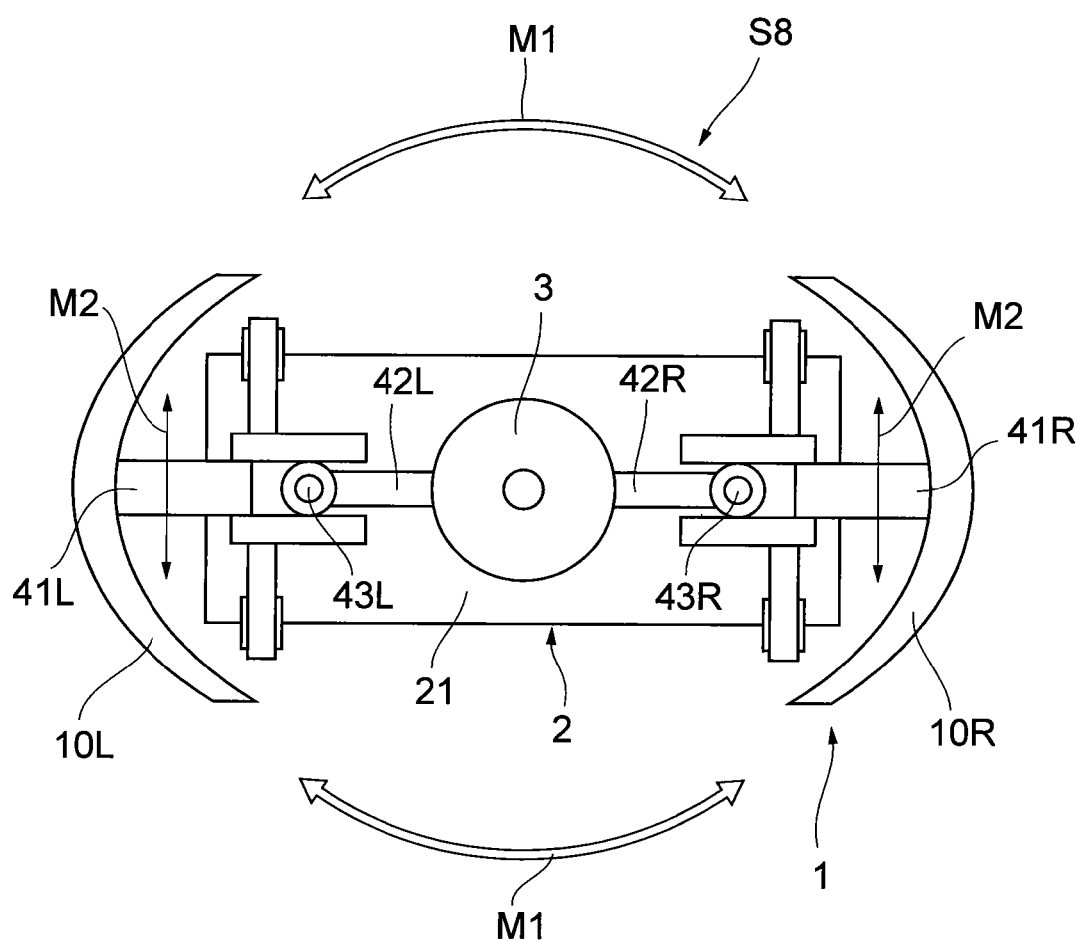
FIG. 14 is a front view of a steering device related to an eighth embodiment.

FIG. 14 is a front view of a steering device related to an eighth embodiment of the invention. A steering device S8 related to the present embodiment is mainly different from the steering device S1 related to the above first embodiment in that left and right sliding members 41L and 41R and left and right rocking arms 42L and 42R are provided instead of the left and right rack members 12L and 12R in the steering member 1. Moreover, another main difference is that the pinion gear 4, the left and right stoppers 13L and 13R, and the stopper receivers 22LU, 22LL, 22RU, and 22RL are not provided.

As shown in FIG. 14, the steering device S8 related to the present embodiment is equipped with the same guide member 2 and input shaft 3 as the above first embodiment in addition to the steering member 1. Additionally, the left and right sliding members 41L and 41R are respectively fixed to the left and right grips 10L and 10R in the steering member 1 related to the present embodiment. Both the left and right sliding members 41L and 41R are equipped with two rod members that extend along the radial direction of the input shaft 3.

Additionally, the left and right rocking arms 42L and 42R that extend in the radial direction are attached to the input shaft 3, and left and right roller members 43L and 43R are attached to the respective tip portions of the left and right rocking arms 42L and 42R. Moreover, the left and right roller members 43L and 43R are respectively arranged so as to be pinched between the two rod members in the left and right sliding members 41L and 41R.

Next, the operation and effects of the steering device S8 related to the present embodiment will be described. In the steering device S8 related to the present embodiment, similarly to the steering device S1 related to the above first embodiment, in a case the driver intends, for example, a left turn from the neutral position, the left and right grips 10L and 10R are moved in the second movement direction M2. Specifically, the left grip 10L is moved downward and the right grip 10R is moved upward.

Figure 15:
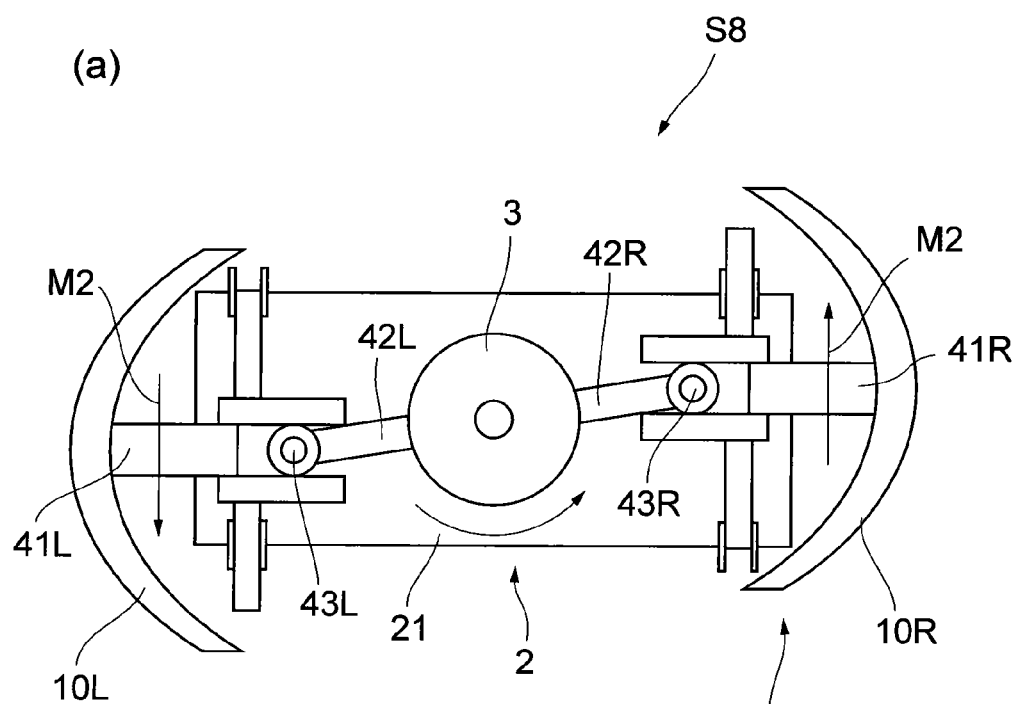
FIG. 15(a) is a front view showing a state where the steering device related to the eighth embodiment moves.
FIG. 15(b) is a front view showing movement following the movement of FIG. 15(a).
Figure 15:
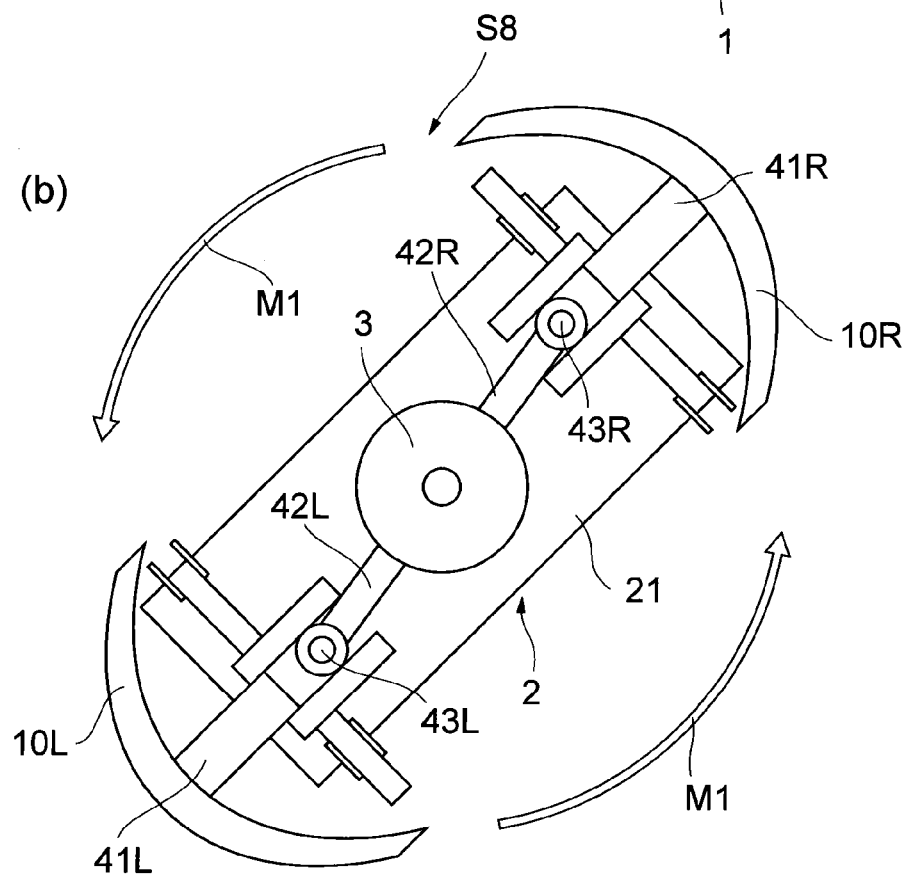

The left and right sliding members 41L and 41R move downward and upward relative to the guide member 2, respectively, with the movement of the left and right grips 10L and 10R. If the left and right sliding members 41L and 41R move downward and upward, respectively, as shown in FIG. 15(a), the left and right roller members 43L and 43R attached to the tips of the left and right rocking arms 42L and 42R slide on the left and right sliding members 41L and 41R. For this reason, the tip portions of the left and right rocking arms 42L and 42R move upward and downward, respectively. The input shaft 3 rotates in the counterclockwise direction that is the first movement direction M1 through the movement of the left and right rocking arms 42L and 42R. The steered wheels (not shown) are turned small in the left turn direction by the rotation of the input shaft 3.

Then, if the left and right grips 10L and 10R are further moved and the left and right rocking arms 42L and 42R abut against the left and right sliding members 41L and 41R, respectively, the movement of the left and right rocking arms 42L and 42R with respect to the guide member 2 is regulated. If the right grip 10R is further moved upward and the left grip 10L is further moved downward, the position in the vicinity of a longitudinal tip portion of each of the left and right rocking arms 42L and 42R abut against a tip portion of one of the two rod members in the left and right sliding members 41L and 41R. As the left and right rocking arms 42L and 42R abut against the rod members of the left and right sliding members 41L and 41R, as shown in FIG. 15(b), the overall steering member 1 including the left and right grips 10L and 10R rotates in the counterclockwise direction around the input shaft 3 with the guide member 2. The input shaft 3 is rotated in the same direction with the rotation of the guide member 2. The steered wheels (not shown) are largely turned in the left turn direction by the rotation of the input shaft 3.

In this way, in the steering device S8 related to the present embodiment, the left and right grips 10L and 10R are made movable in the two directions of the vertical direction and the rotational direction around the input shaft 3 in turning the steered wheels. Here, the steering device S8 is formed with a movement direction changing mechanism equipped with the left and right sliding members 41L and 41R and the left and right rocking arms 42L and 42R. For this reason, the movement in the vertical direction is integrated until the movement is changed to the rotational direction around the input shaft 3 and is transmitted to the steering system. Accordingly, the left and right grips 10L and 10R are made movable in the two directions of the vertical direction and the rotational direction around the input shaft 3, and a simple configuration can be provided. Additionally, generation of teeth knocking sound that occurs in a case where a rack-and-pinion mechanism or the like is used can be prevented, and the rigidity around the shaft when the operation in the second movement direction M2 is performed can be made high.

Ninth Embodiment

Figure 16:
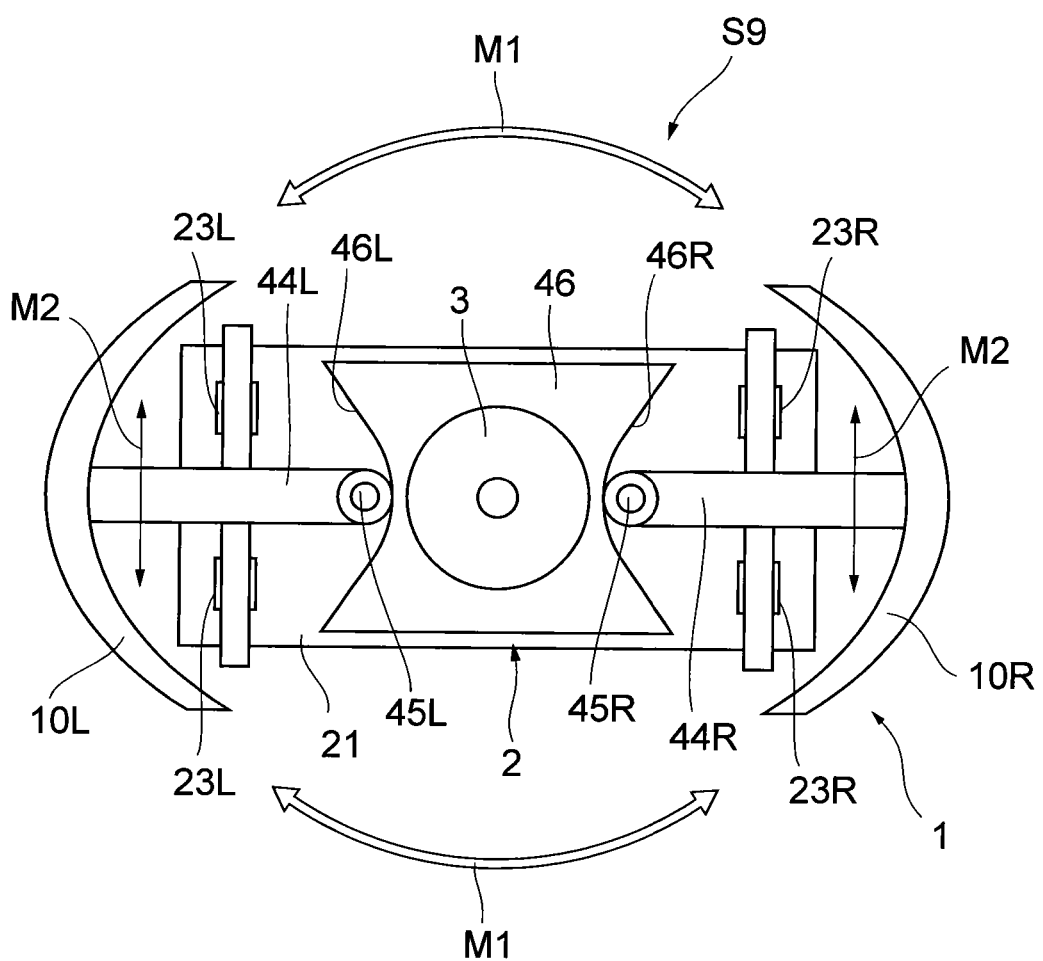
FIG. 16 is a front view of a steering device related to a ninth embodiment.

FIG. 16 is a front view of a steering device related to a ninth embodiment of the invention. A steering device S9 related to the present embodiment is mainly different from the steering device S1 related to the above first embodiment in that left and right roller support rod members 44L and 44R, left and right rollers 45L and 45R, and a cam shaft 46 are provided instead of the left and right rack members 12L and 12R in the steering member 1. Moreover, another main difference is that the pinion gear 4, the left and right stoppers 13L and 13R, and the stopper receivers 22LU, 22LL, 22RU, and 22RL are not provided.

As shown in FIG. 16, the steering device S9 related to the present embodiment is equipped with the same guide member 2 and input shaft 3 as the above first embodiment in addition to the steering member 1. Additionally, the left and right roller support rod members 44L and 44R are respectively fixed to the left and right grips 10L and 10R in the steering member 1 related to the present embodiment. Both the left and right roller support rod members 44L and 44R extend along the radial direction of the input shaft 3, and have the left and right rollers 45L and 45R attached to the tip portions thereof, respectively.

Additionally, the guide plate 21 in the guide member 2 is provided with guide projections 23L and 23R that guides the movement of the left and right roller support rod members 44L and 44R. The guide projections 23L and 23R are all formed along the second movement direction M2, and guide the left and right roller support rod members 44L and 44R in the second movement direction M2.

The cam shaft 46 is attached to the tip portion of the input shaft 3. The cam shaft 46 is formed with left and right sliding surfaces 46L and 46R that are curved surfaces on that the left and right rollers 45L and 45R slide, respectively. For this reason, the left and right grips 10L and 10R are made movable in directions along the left and right sliding surfaces 46L and 46R.

Moreover, the distance between the left sliding surface 46L and the right sliding surface 46R is the shortest at middle positions of the sliding surfaces when the steering device S9 is in a neutral state, and the distance between both becomes longer gradually as the sliding surfaces move in the vertical direction. Here, if the distance between the left sliding surface 46L and the right sliding surface 46R in the cam shaft 46 becomes longer than the distance between the left roller 45L and the right roller 45R, the cam shaft 46 and the input shaft 3 rotate with the rotation of the left and right grips 10L and 10R.

The cam shaft 46 is made rotatable around the input shaft 3 as the left and right rollers 45L and 45R slide on the left and right sliding surfaces 46L and 46R, respectively. As the cam shaft 46 rotates, the rotation of the cam shaft 46 is transmitted to the input shaft 3, and the input shaft 3 is adapted to rotate.

Next, the operation and effects of the steering device S9 related to the present embodiment will be described. In the steering device S9 related to the present embodiment, similarly to the steering device S1 related to the above first embodiment, in a case the driver intends, for example, a left turn from the neutral position, the left and right grips 10L and 10R are moved in the second movement direction M2. Specifically, the left grip 10L is moved downward and the right grip 10R is moved upward.

Figure 17:
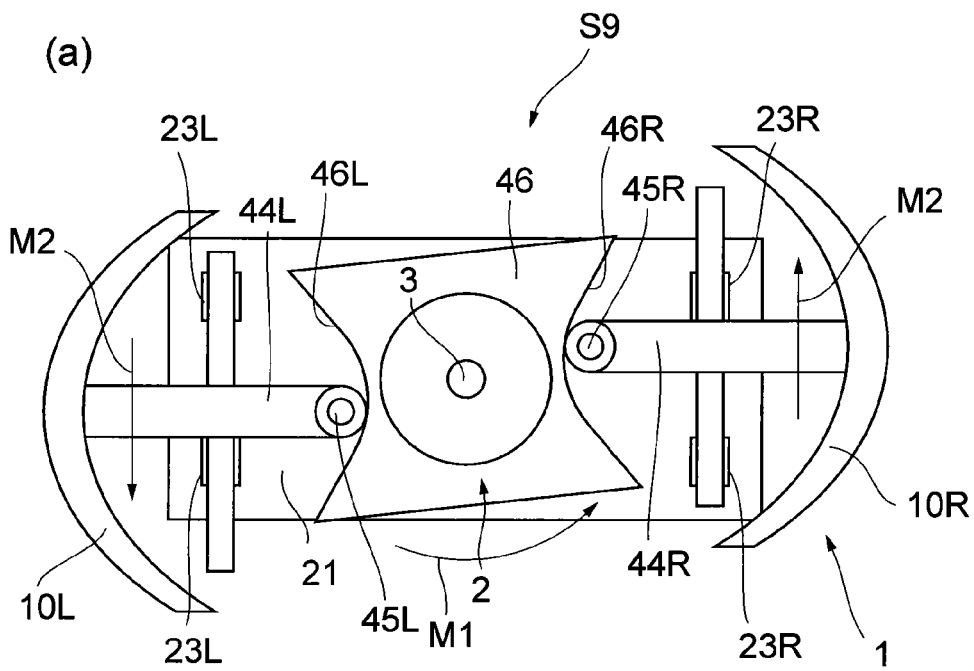
FIG. 17(a) is a front view showing a state where the steering device related to the ninth embodiment moves.
FIG. 17(b) is a front view showing movement following the movement of FIG. 17(a).
Figure 17:
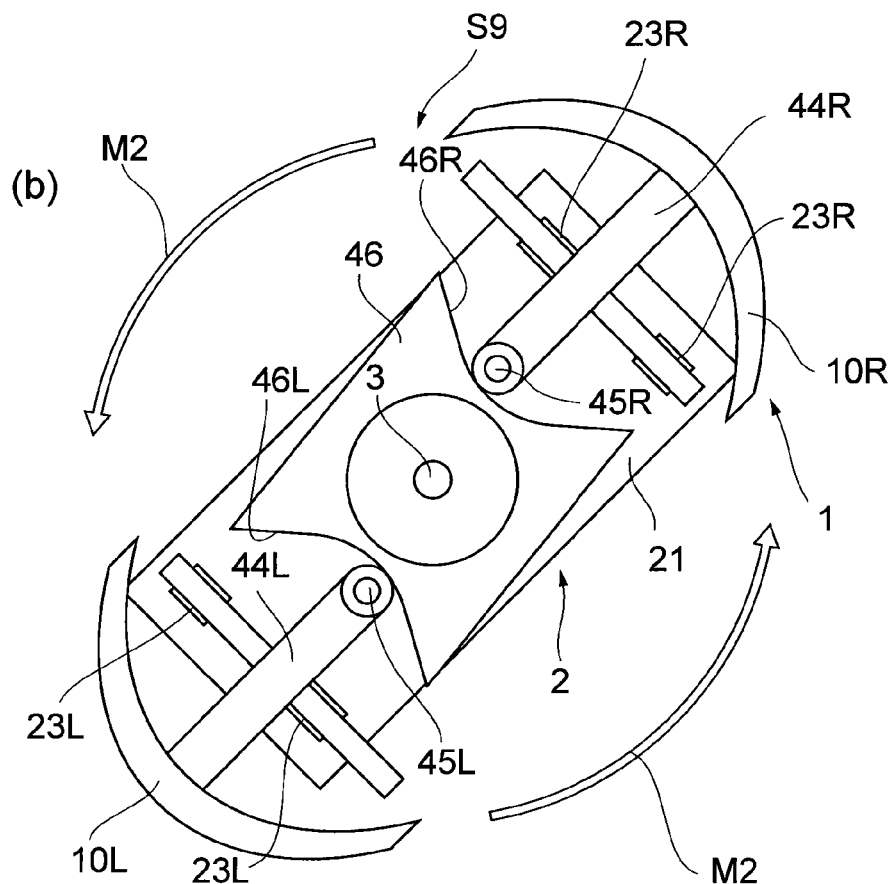

The left and right roller support rod members 44L and 44R move in the second movement direction M2 along the guide projections 23L and 23R, respectively, with the movement of the left and right grips 10L and 10R. If the left and right roller support rod members 44L and 44R move, as shown in FIG. 17(a), the left and right rollers 45L and 45R attached to the tips of the left and right roller support rod members 44L and 44R slide on the left and right sliding surfaces 46L and 46R in the cam shaft 46.

At this time, the distance between the left sliding surface 46L and the right sliding surface 46R in the cam shaft 46 is the shortest at middle positions of the sliding surfaces when the steering device S9 is in a neutral state, and the distance between both becomes longer gradually as the sliding surfaces move in the vertical direction. For this reason, if the left and right rollers 45L and 45R slide on the left and right sliding surfaces 46L and 46R in the cam shaft 46, the cam shaft 46 rotates in the counterclockwise direction that is the first movement direction M1, and the input shaft 3 rotates in the counterclockwise direction with the rotation of the cam shaft 46. The steered wheels (not shown) are turned small in the left turn direction by the rotation of the input shaft 3.

Then, if the left and right grips 10L and 10R are further moved and the distance between the left sliding surface 46L and the right sliding surface 46R in the cam shaft 46 becomes longer than the distance between the left roller 45L and the right roller 45R, the movement of the left and right roller support rod members 44L and 44R is regulated. Then, if the right grip 10R is further moved upward and the left grip 10L is further moved downward, as shown in FIG. 17(b), the cam shaft 46 rotates in a state where the cam shaft 46 is pinched between the left roller 45L and the right roller 45R, and the guide member 2 rotates in the counterclockwise direction around the input shaft 3 that is the first movement direction M1. The input shaft 3 is rotated in the same direction with the rotation of the guide member 2. The steered wheels (not shown) are largely turned in the left turn direction by the rotation of the input shaft 3.

In this way, in the steering device S9 related to the present embodiment, the left and right grips 10L and 10R are made movable in the two directions of the second movement direction M2 that is the vertical direction and the first movement direction M1 that is the rotational direction around the input shaft 3 in turning the steered wheels. Here, the steering device S9 is formed with a movement direction changing mechanism equipped with the left and right roller support rod members 44L and 44R, the left and right rollers 45L and 45R, and the cam shaft 46. For this reason, the movement in the direction along the left and right sliding surfaces 46L and 46R of the cam shaft 46 is integrated until the movement is changed to the rotational direction around the input shaft 3 and is transmitted to the steering system. Accordingly, the left and right grips 10L and 10R are made movable in the two directions of the vertical direction and the rotational direction around the input shaft 3, and a simple configuration can be provided. Additionally, generation of teeth knocking sound that occurs in a case where a rack-and-pinion mechanism or the like is used can be prevented, and the rigidity around the shaft when the operation in the second movement direction M2 is performed can be made high.

Tenth Embodiment

Figure 18:
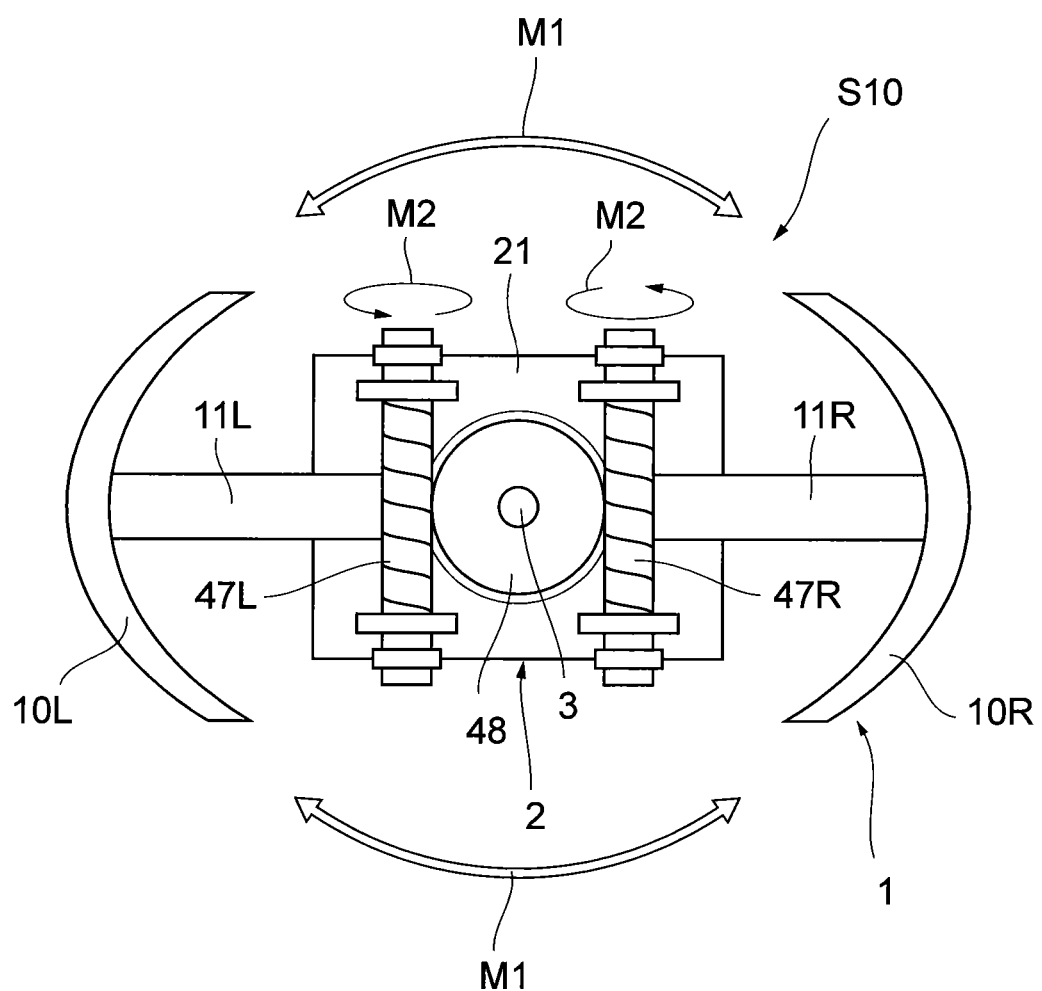
FIG. 18 is a front view of a steering device related to a tenth embodiment.

FIG. 18 is a front view of a steering device related to a tenth embodiment of the invention. A steering device S10 related to the present embodiment is mainly different from the steering device S1 related to the above first embodiment in that left and right worm gear members 47L and 47R are provided instead of the left and right rack members 12L and 12R in the steering member 1, and a worm wheel 48 is provided instead of the pinion gear 4.

As shown in FIG. 18, the steering device S10 related to the present embodiment is equipped with the same guide member 2 and input shaft 3 as the above first embodiment in addition to the steering member 1. Additionally, the left and right rods 11L and 11R are fixed to the left and right grips 10L and 10R in the steering member 1 related to the present embodiment, and the left and right rods 11L and 11R are provided with the left and right worm gear members 47L and 47R, respectively.

Additionally, the worm wheel 48 is attached to the tip portion of the input shaft 3. The left and right worm gear members 47L and 47R mesh with the worm wheel 48, respectively. For this reason, the left and right grips 10L and 10R are made movable in a direction passing through the sheet plane in FIG. 18.

Figure 19:
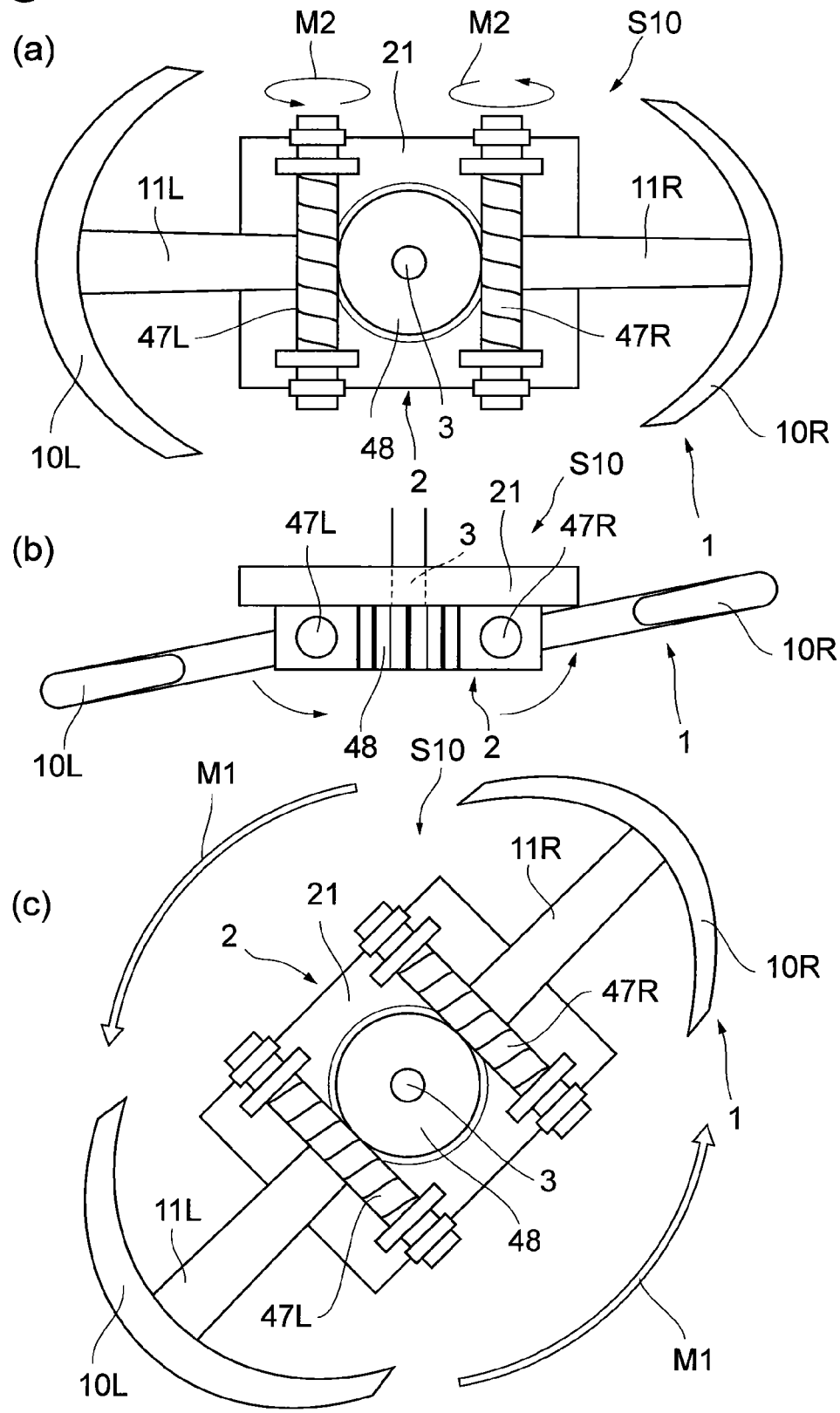
FIG. 19(a) is a front view showing a state where the steering device related to the tenth embodiment moves.
FIG. 19(b) is a plan view thereof.
FIG. 19(c) is a front view showing movement following the movement of FIG. 19(a).

Next, the operation and effects of the steering device S10 related to the present embodiment will be described. In the steering device S10 related to the present embodiment, in a case the driver intends, for example, a left turn from the neutral position, as shown in FIGS. 19(*a*) and 19(*b*), the left grip 10L is moved forward when viewed from the driver and the right grip 10R is moved backward when viewed from the driver. In this way, the left grip 10L is rotated around the left worm gear member 47L that is the second movement direction M2. Similarly, the right grip 10R is rotated around the right worm gear member 47R that is the second movement direction M2.

The left and right worm gear members 47L and 47R rotate with the movement of the left and right grips 10L and 10R. With the rotation of the left and right worm gear members 47L and 47R, as shown in FIG. 19(*a*), the worm wheel 48 rotates in the counterclockwise direction around the input shaft 3 that is the first movement direction M1. The input shaft 3 also rotates with the rotation of the worm wheel 48. The steered wheels (not shown) are turned small in the left turn direction by the rotation of the input shaft 3.

Thereafter, if the left and right grips 10L and 10R are further moved in the same direction, the meshing teeth between the left and right worm gear members 47L and 47R and the worm wheel 48 disappear, and the movement of the left and right grips 10L and 10R with respect to the worm wheel 48 is regulated. Thereafter, if the left and right grips 10L and 10R are further moved in the same direction, as shown in FIG. 19(*c*), the worm wheel 48 is integrated with the input shaft 3, and the guide member 2 rotates in the counterclockwise direction around the input shaft 3 that is the first movement direction M1. The input shaft 3 is rotated in the same direction with the rotation of the guide member 2. The steered wheels (not shown) are largely turned in the left turn direction by the rotation of the input shaft 3.

In this way, in the steering device S10 related to the present embodiment, the left and right grips 10L and 10R are made movable in the two directions of the second movement direction M2 around the left and right worm gear members 47L and 47R and the first movement direction M1 around the input shaft 3 in turning the steered wheels. Here, the steering device S10 is formed with a movement direction changing mechanism equipped with the left and right worm gear members 47L and 47R and the worm wheel 48. For this reason, the movement in the front-and-rear direction viewed from the driver is integrated until the movement is changed to the rotational direction around the input shaft 3 and is transmitted to the steering system. Accordingly, the movement in the two directions of the second movement direction M2 around the left and right worm gear members 47L and 47R and the first movement direction M1 around the input shaft 3 is possible, and a simple configuration can be provided.

Eleventh Embodiment

Figure 20:
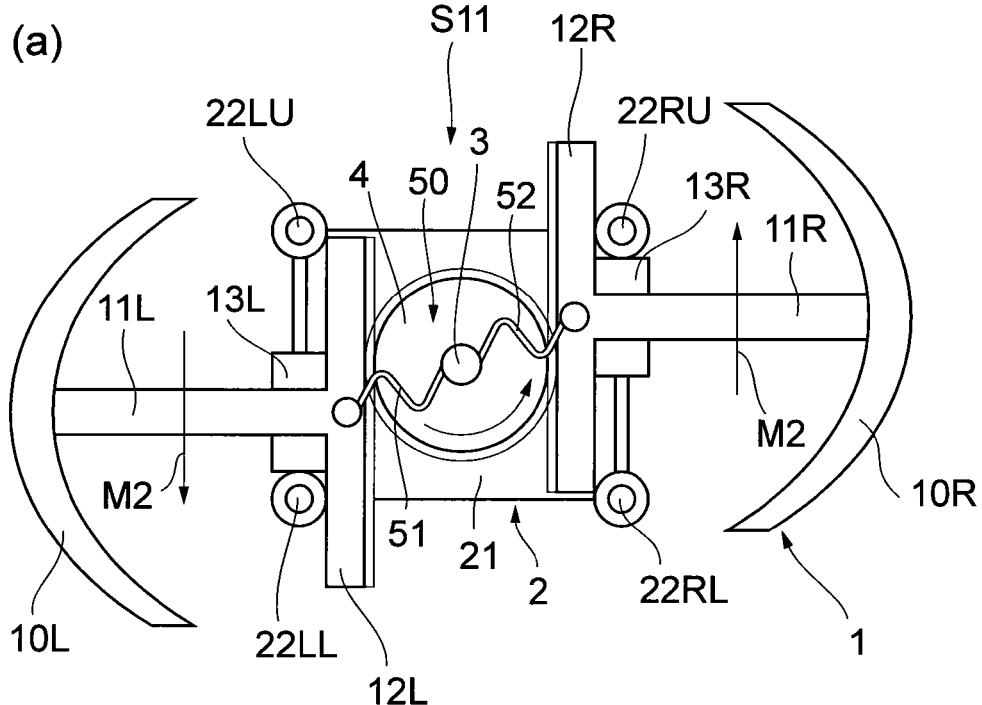
FIG. 20(a) is a front view of a steering device related to an eleventh embodiment.
FIG. 20(b) is a front view of a modification of the steering device related to the eleventh embodiment.
Figure 20:
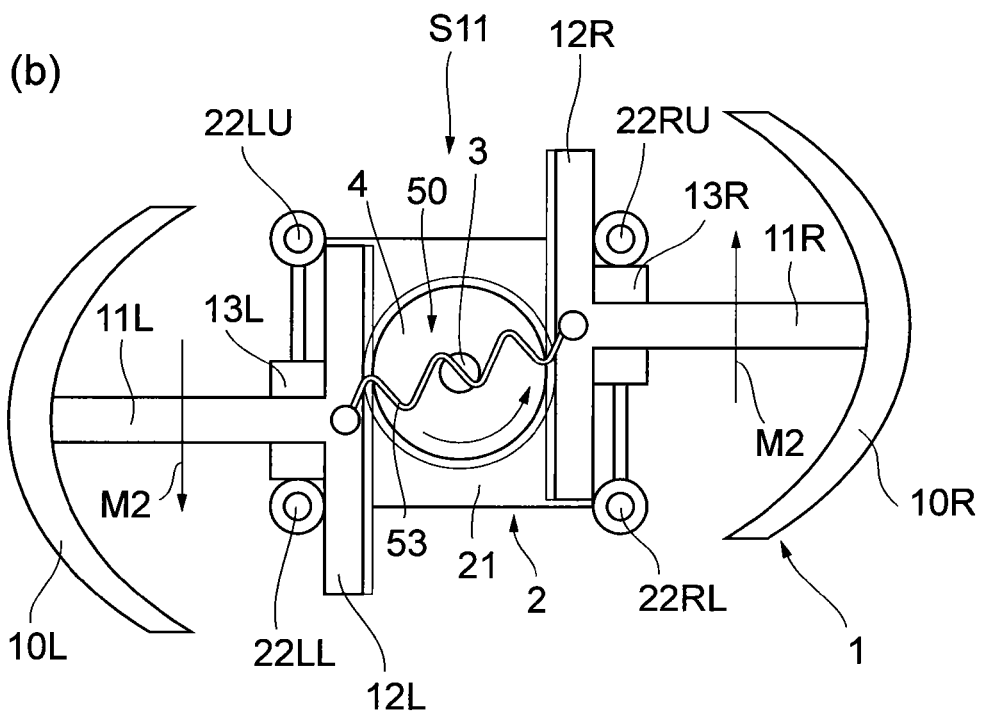

An eleventh embodiment will be described. FIG. 20(*a*) is a front view of a steering device related to an eleventh embodiment, and FIG. 20(*b*) a front view of a modification of the steering device related to the eleventh embodiment. As shown in FIG. 20(*a*), a steering devices S11 related to the present embodiment is mainly different from the steering device S1 related to the above first embodiment in that a neutral position restoring mechanism 50 is provided between the left and right racks 12L and 12R and the input shaft 3.

The neutral position restoring mechanism 50 is equipped with a left restoring spring 51 and a right restoring spring 52. The left restoring spring 51 is stretched between the left rack 12L and the input shaft 3. Additionally, the right restoring spring 52 is stretched between the right rack 12R and the input shaft 3. In this way, the left and right grips 10L and 10R are urged in the direction of the neutral position by the neutral position restoring mechanism 50.

Next, the operation and effects of the steering device S11 related to the present embodiment will be described. In the steering device S11 related to the present embodiment, similarly to the above first embodiment, in a case the driver intends, for example, a left turn from the neutral position, the left and right grips 10L and 10R are moved in the second movement direction M2. Specifically, the left grip 10L is moved downward and the right grip 10R is moved upward.

In this way, the left and right grips 10L and 10R move in the vertical direction and the input shaft 3 rotates small until the left and right stoppers 13L and 13R abut against the stopper receivers 22LU, 22LL, 22RU, and 22RL. As a result, a small steering angle of turning is performed. The input shaft 3 is rotated by the rotation of the steering member 1 including the left and right grips 10L and 10R and the guide member 2 after the left and right stoppers 13L and 13R abut against the stopper receivers 22LU, 22LL, 22RU, and 22RL. Accordingly, the same working effects as the steering device S1 related to the above first embodiment can be obtained.

Moreover, the steering device S11 related to the present embodiment is provided with the neutral position restoring mechanism 50. For this reason, the neutral position restoring mechanism 50 imparts a restoring force toward the neutral position from a moved position after being moved from the left and right grips 10L and 10R. Accordingly, the neutral position restoring mechanism 50 can easily restore the left and right grips 10L and 10R to the neutral position.

Here, as for the neutral position restoring mechanism 50 in the steering device S11 related to the present embodiment, an aspect shown in FIG. 20(b) can also be adopted in addition to the aspect shown in FIG. 20(a). The neutral position restoring mechanism 50 in the steering device S11 shown in FIG. 20(b) is equipped with a restoring spring 53. The restoring spring 53 is stretched between the left rack 12L and the right rack 12R, and the left and right grips 10L and 10R are urged in the direction of the neutral position by the neutral position restoring mechanism 50. An aspect in which the neutral position restoring mechanism 50 is formed by such an aspect can be adopted.

Twelfth Embodiment

Figure 21:
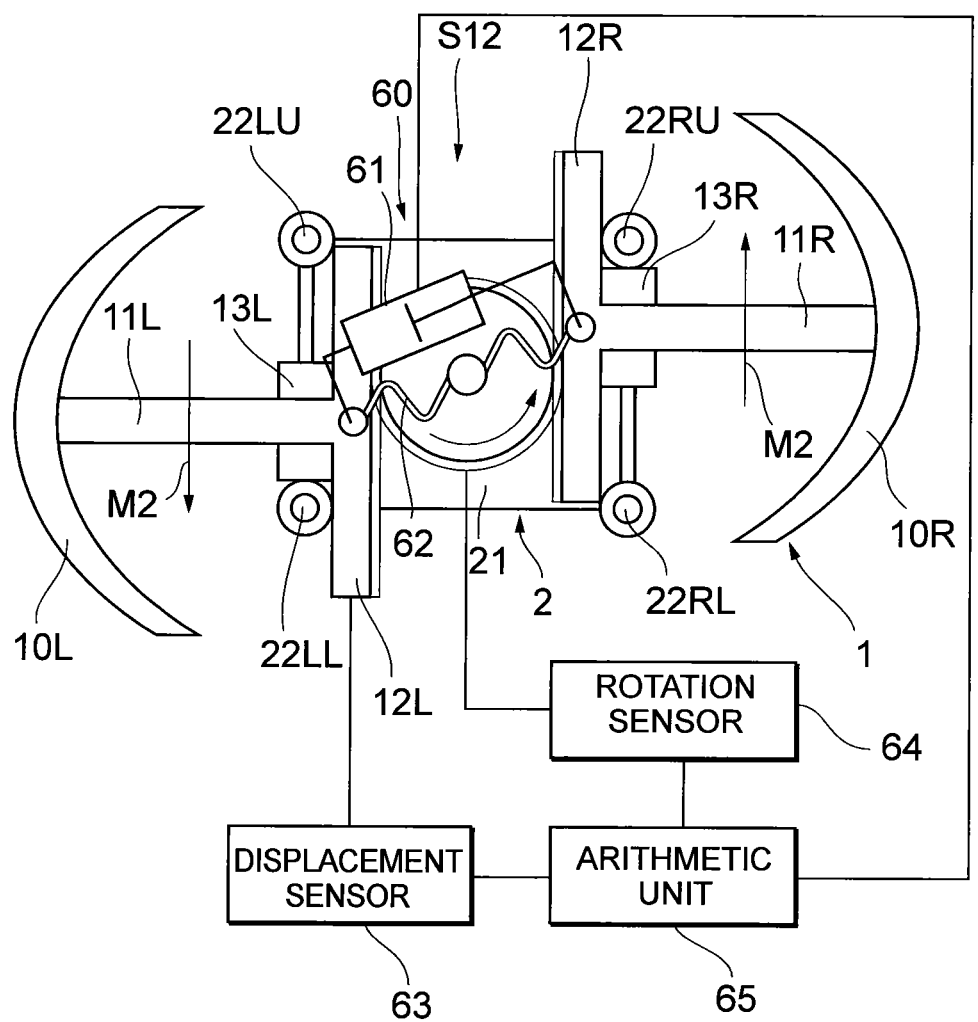
FIG. 21 is a front view of a steering device related to a twelfth embodiment.

A twelfth embodiment will be described. FIG. 21 is a front view of a steering device related to a twelfth embodiment. As shown in FIG. 21, a steering device S12 related to the present embodiment is mainly different from the steering device S1 related to the above first embodiment in that a variable damping force device 60 is provided.

The variable damping force device 60 is equipped with an absorber 61 and a spring 62, and is stretched between the left rack member 12L and the right rack member 12R. Additionally, the variable damping force device 60 is equipped with a displacement sensor 63, a rotation sensor 64, and an arithmetic unit 65. The displacement sensor 63 is attached to the left rack member 12L and detects the travel distance (=the travel distance of the left and right grips 10L and 10R) of the left rack member 12L. The displacement sensor 63 transmits the detected displacement amount of the left rack member 12L to the arithmetic unit 65.

The rotation sensor 64 is attached to the input shaft 3 and detects the rotation angle of the input shaft 3. The rotation sensor 64 transmits the detected rotation angle of the input shaft 3 to the arithmetic unit 65. In the arithmetic unit 65, the stroke value of the absorber 61 is calculated on the basis of the displacement amount of the left rack member 12L transmitted from the displacement sensor 63 and the rotation angle of the input shaft 3 transmitted from the rotation sensor 64. In the arithmetic unit 65, the calculated stroke value is transmitted to the absorber 61 and the stroke length of the absorber is adjusted.

Next, the operation and effects of the steering device S12 related to the present embodiment will be described. In the steering device S12 related to the present embodiment, similarly to the above first embodiment, in a case the driver intends, for example, a left turn from the neutral position, the left and right grips 10L and 10R are moved in the second movement direction M2. Specifically, the left grip 10L is moved downward and the right grip 10R is moved upward.

In this way, the left and right grips 10L and 10R move in the vertical direction and the input shaft 3 rotates small until the left and right stoppers 13L and 13R abut against the stopper receivers 22LU, 22LL, 22RU, and 22RL. As a result, a small steering angle of turning is performed. The input shaft 3 is rotated by the rotation of the steering member 1 including the left and right grips 10L and 10R and the guide member 2 after the left and right stoppers 13L and 13R abut against the stopper receivers 22LU, 22LL, 22RU, and 22RL. Accordingly, the same working effects as those of the above first embodiment can be obtained.

Additionally, the steering device S12 related to the present embodiment is provided with the variable damping force device 60. For this reason, the attenuation amount when the left and right grips 10L and 10R are moved and the grips make a movement in the first movement direction can be suitably adjusted. Moreover, by greatly setting the attenuation amount on the return side to the neutral position, the movement in the second movement direction can be suppressed and the stability of operation can be enhanced.

Although preferred embodiments of the invention have been described, the present invention is not limited to the above embodiments. For example, in the above embodiments, an aspect in which the gear ratio variable sliding mechanism shown in FIG. 7 is provided in the steering device S1 in the first embodiment is described. However, aspects in which the gear ratio variable sliding mechanism is provided even in other embodiments can be adopted. Additionally, the neutral position restoring mechanism 50 shown in FIG. 20 or the variable damping force device 60 shown in FIG. 21 can also provided in the steering devices other than steering device S1 related to the above first embodiment.

INDUSTRIAL APPLICABILITY

The invention can be used as a steering device that is provided at a driver's seat or the like of a vehicle and is enabled to be steered and operated by a driver or the like.

REFERENCE SIGNS LIST

1: STEERING MEMBER
2: GUIDE MEMBER
3: INPUT SHAFT
4, 5: PINION GEAR
6: CYLINDRICAL TRANSMISSION MEMBER
7: DISC-LIKE TRANSMISSION MEMBER
10L, 10R: GRIP
11, 11L, 11R: ROD
12L, 12R: RACK MEMBER
13L, 13R: STOPPER
14L, 14R: CURVED RACK
14LU, 14LL, 14RU, 14RL: PROJECTION PORTION
15L, 15R: RACK MEMBER
16L, 16R: ROCKING ROD
17L, 17R: STOPPER
18L, 18R: WIRE MEMBER
19L, 19R: SLIDER MEMBER
20L, 20R: ROTATION TRANSMISSION MEMBER
21: GUIDE PLATE
22LU, 22LL, 22RU, 22RL: STOPPER RECEIVER
23L, 23: GUIDE PROJECTION
30: ROCKING LINK MECHANISM
31LU, 31LL, 31RU, 31RL: LINK
32U, 32L: ROCKING SHAFT
33LU, 33LL, 33RU, 33RL: STOPPER
41L, 41R: SLIDING MEMBER
42L, 42R: ROCKING ARM
43L, 43R: ROLLER MEMBER
44L, 44R: ROLLER SUPPORT ROD MEMBER
45L, 45R: ROLLER
46: CAM SHAFT
46L, 46R: SLIDING SURFACE
47L, 47R: WORM GEAR MEMBER
48: WORM WHEEL
50: NEUTRAL POSITION RESTORING MECHANISM
60: VARIABLE DAMPING FORCE DEVICE
61: ABSORBER
62: SPRING
63: DISPLACEMENT SENSOR
64: ROTATION SENSOR
65: ARITHMETIC UNIT
S1 TO S12: STEERING DEVICE

The invention claimed is:

1. A steering device comprising:
a steering operation element operable by a driver, the steering operation element enabled to operate in a first movement direction that is a movement direction around a main input shaft that transmits a movement of the steering operation element to a steering system and a second movement direction that is a direction different from the first movement direction;
a movement direction changing mechanism changing an operation of the steering operation element in the second movement direction to an operation of the main input shaft in the first movement direction;
a guide member being rotatably provided with the main input shaft, the main input shaft rotating with the rotation thereof;
a stopper moving with the steering operation element in the second movement direction; and
a stopper receiver being fixed to the guide member and regulating the movement of the steering operation element in the second movement direction by abutting on the stopper,
wherein the movement changing direction mechanism comprises a rack member attached to the steering operation element, and a pinion fixed to the main input shaft and meshing with the rack member,
wherein a change ratio of the movement direction changing mechanism in the first movement direction varies according to an amount of input in the second movement direction,
wherein the rack member is attached to the steering operation element via a rod, the stopper is provided between the rod and the rack member, and the stopper moves with the rod and the rack member in the second movement direction, and
wherein, when the stopper and the stopper receiver are separated, the operation of the steering operation element in the second movement direction is changed to the operation of the main input shaft in the first movement direction through the movement direction changing mechanism, and when the stopper and the stopper receiver are abutted, the operation of the main input shaft in the first movement direction is performed by the operation of the steering operation element in the first movement direction without the interposition of the movement direction changing mechanism.

2. The steering device according to claim 1,
wherein a reaction force in the second movement direction is set to be smaller than a reaction force in the first movement direction.

3. The steering device according to claim 1,
wherein a neutral position is set in the steering operation element, and
wherein restoring force imparting means is provided to restore the steering operation element to the neutral position.

4. The steering device according to claim 1,
wherein damping force imparting means is provided to impart a damping force according to the amount of input in the second movement direction to the steering operation element.

5. A steering device comprising:
a steering operation element operable by a driver, the steering operation element enabled to operate in a first movement direction that is a movement direction around a main input shaft that transmits a movement of the steering operation element to a steering system and a second movement direction that is a direction different from the first movement direction;
a movement direction changing mechanism changing an operation of the steering operation element in the second movement direction to an operation of the main input shaft in the first movement direction;
a guide member being rotatably provided with the main input shaft, the main input shaft rotating with the rotation thereof;
a stopper moving with the steering operation element in the second movement direction; and
a stopper receiver being fixed to the guide member and regulating the movement of the steering operation element in the second movement direction by abutting on the stopper,
wherein the second movement direction is a tangential direction of a virtual circle that is a locus in the first movement direction
wherein the movement direction changing mechanism comprises a rack member attached to the steering operation element, and a pinion fixed to the main input shaft and meshing with the rack member,
wherein the rack member is attached to the steering operation element via a rod, the stopper is provided between the rod and the rack member, and the stopper moves with the rod and the rack member in the second movement direction, and
wherein, when the stopper and the stopper receiver are separated, the operation of the steering operation element in the second movement direction is changed to the operation of the main input shaft in the first movement direction through the movement direction changing mechanism, and when the stopper and the stopper receiver are abutted, the operation of the main input shaft in the first movement direction is performed by the operation of the steering operation element in the first movement direction without the interposition of the movement direction changing mechanism.

6. The steering device according to claim 5,
wherein the pinion is a rotation member enabled to rotate in the first movement direction, and the rack is a curved member formed with a curved surface and enabled to move in the second movement direction,
wherein the rotation member rotates along the curved surface in the curved member with a movement of the curved member,
wherein a curvature of the curved surface in the curved member decreases toward end portions of the curved surface, and
wherein a distance between the end portions of the curved surface and a rotation center of the rotation member is smaller than a radius of the rotation member.

* * * * *